(12) United States Patent
Benke et al.

(10) Patent No.: US 11,694,859 B2
(45) Date of Patent: Jul. 4, 2023

(54) CRADLE ASSIST DEVICES AND RELATED KITS AND METHODS

(71) Applicant: Eaton Intelligent Power Limited, Dublin (IE)

(72) Inventors: James Jeffery Benke, Pittsburgh, PA (US); Koustubh Dnyandeo Ashtekar, Moon Township, PA (US); Hongbin Wang, Novi, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 125 days.

(21) Appl. No.: 17/225,671

(22) Filed: Apr. 8, 2021

(65) Prior Publication Data

US 2021/0225600 A1 Jul. 22, 2021

Related U.S. Application Data

(62) Division of application No. 16/546,401, filed on Aug. 21, 2019, now Pat. No. 11,004,623, which is a
(Continued)

(51) Int. Cl.
| | |
|---|---|
| *H01H 71/12* | (2006.01) |
| *H02B 11/00* | (2006.01) |
| *H01H 9/24* | (2006.01) |
| *H01H 71/32* | (2006.01) |
| *H02B 11/133* | (2006.01) |
| *H02B 11/167* | (2006.01) |

(52) U.S. Cl.
CPC .............. *H01H 9/24* (2013.01); *H01H 71/12* (2013.01); *H01H 71/32* (2013.01); *H02B 11/133* (2013.01); *H02B 11/167* (2013.01)

(58) Field of Classification Search
None
See application file for complete search history.

(56) References Cited

U.S. PATENT DOCUMENTS 5,459,293 A * 10/1995 Hodkin .................. H02B 11/12
361/609
6,031,192 A 2/2000 Liebetruth
(Continued)

FOREIGN PATENT DOCUMENTS

| FR | 1255812 A | 3/1961 |
|---|---|---|
| WO | 02087037 A1 | 10/2002 |

OTHER PUBLICATIONS

European Search Report corresponding to European Patent Application No. 15155162.9 (8 pages) (dated Sep. 30, 2015).

*Primary Examiner* — Courtney L Smith
(74) *Attorney, Agent, or Firm* — Eckert Seamans Cherin & Mellott, LLC

(57) ABSTRACT

Cradle-assist assemblies attached to the breaker cradle housing and/or base or residing at least partially in the breaker cradle housing and/or base include at least one actuator configured to laterally translate the at least one right and the at least one left lock members from the extended lock position to the retracted unlocked position in response to input from a user. The at least one actuator and/or transverse member(s) can be held in a defined position so that the lock members of the cradle can be locked in the respective retracted or extended positions until the cradle assist (internal) lock is manually or automatically released.

9 Claims, 32 Drawing Sheets

Related U.S. Application Data division of application No. 15/432,625, filed on Feb. 14, 2017, now Pat. No. 10,431,399, which is a division of application No. 14/211,531, filed on Mar. 14, 2014, now Pat. No. 9,607,784.

(56) References Cited

U.S. PATENT DOCUMENTS

| | | |
|---|---|---|
| 6,689,968 B2 | 2/2004 | Trivette et al. |
| 6,884,949 B2 | 4/2005 | Yoon |
| 7,124,488 B2 | 10/2006 | Ford et al. |
| 7,368,674 B2 | 5/2008 | Parker et al. |
| 7,545,245 B2 | 6/2009 | Zhou et al. |
| 8,164,875 B1 | 4/2012 | Ledbetter et al. |
| 8,304,672 B2 * | 11/2012 | Lee ................ H02B 11/127 200/50.25 |
| 9,673,595 B2 * | 6/2017 | Benke ................ H02B 3/00 |
| 2003/0184945 A1 * | 10/2003 | Trivette ............ H02B 11/133 361/139 |
| 2004/0135479 A1 | 7/2004 | Haselby et al. |
| 2009/0014292 A1 * | 1/2009 | Lyu ................ H02B 11/133 200/50.26 |
| 2010/0230256 A1 | 9/2010 | Lee et al. |
| 2010/0230257 A1 * | 9/2010 | Kim ................ H01H 33/666 200/50.25 |
| 2010/0236905 A1 | 9/2010 | Capelli |
| 2011/0147172 A1 | 6/2011 | Kim et al. |
| 2013/0077208 A1 | 3/2013 | Fischer-Carne et al. |
| 2013/0088812 A1 * | 4/2013 | Yee ................ H01H 9/226 361/609 |
| 2015/0114807 A1 | 4/2015 | Benke et al. |
| 2016/0301196 A1 * | 10/2016 | Hanna ............ H02B 11/133 |

* cited by examiner

RETROFIT ARRANGEMENT – 1: CRADLE IN CRADLE (CIC)

RETROFIT ARRANGEMENT – 2: ROLL IN REPLACEMENT (RIR)

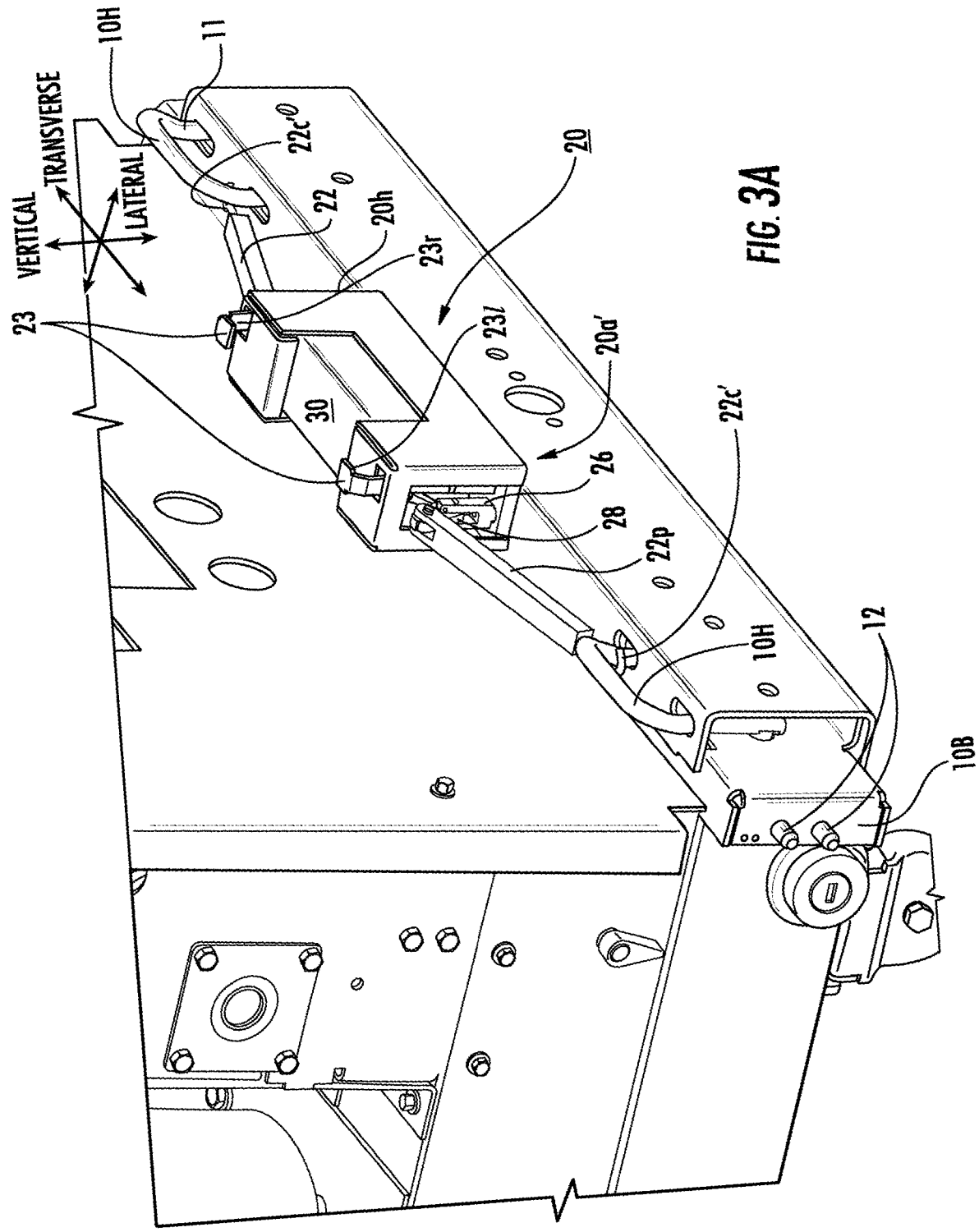

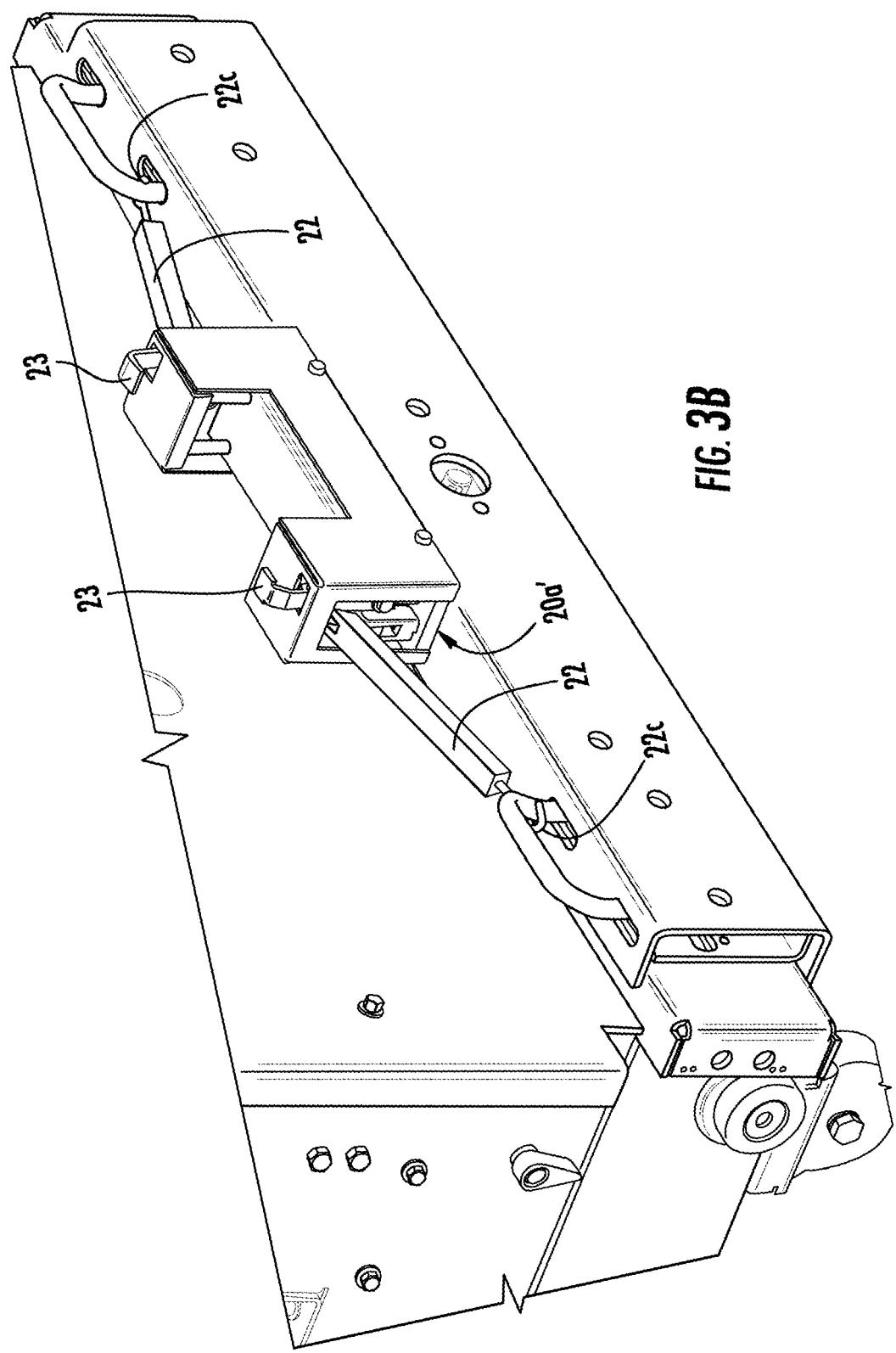

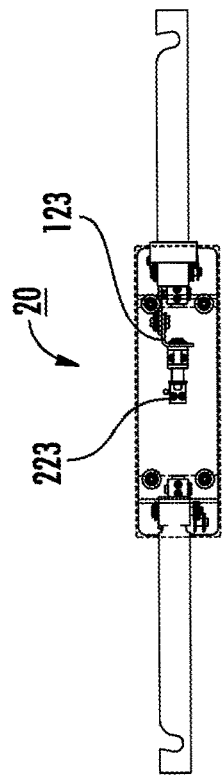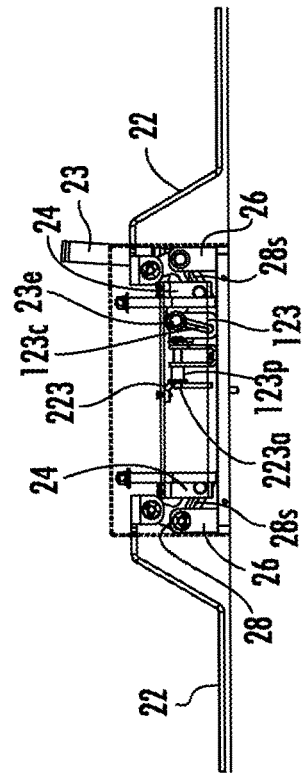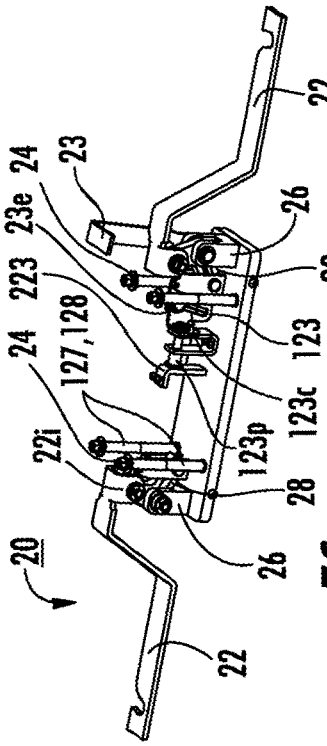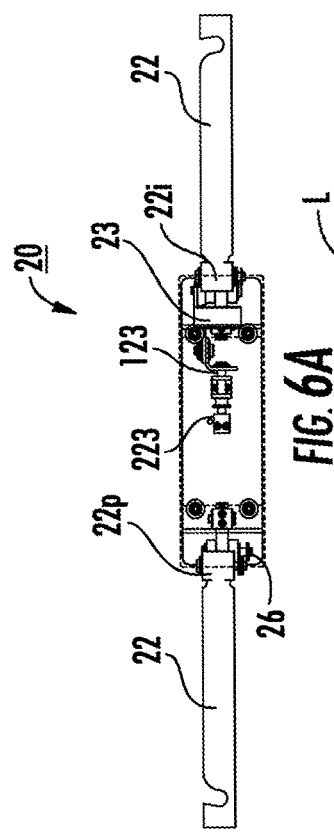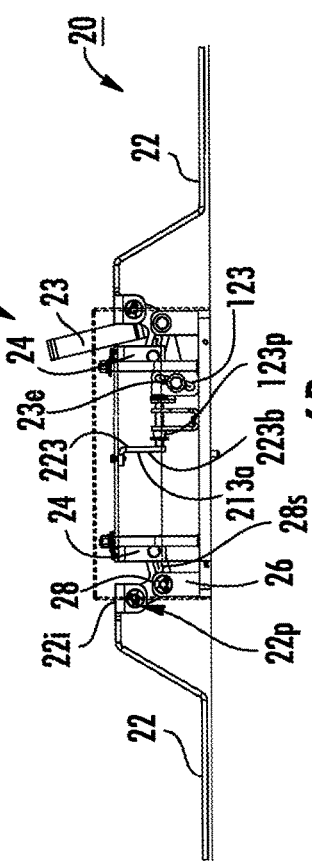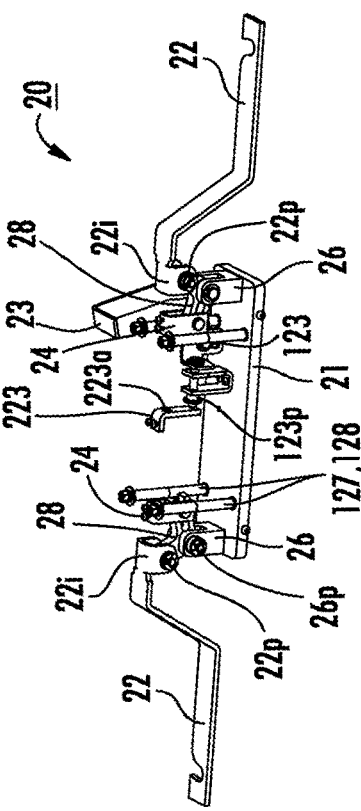

FIELD ASSEMBLY INSTRUCTIONS

1. PUT THE KIT ON THE BREAKER CRADLE OR BASE OR EQUIVALENT SUCH THAT THE TRANSVERSE ARMS CAN ENGAGE THE PULL HANDLES
2. PLACE THE KIT CENTRALLY AS POSSIBLE. INSERT THE LOCK PINS IN THE BASE AS APPLICABLE
3. ENGAGE THE LEFT SIDE TRANSVERSE ARM IN THE LEFT SIDE OR EQUIVALENT PULL HANDLE
4. ENGAGE THE RIGHT SIDE TRANSVERSE ARM IN THE RIGHT SIDE OR EQUIVALENT PULL HANDLE
5. ADJUST THE STROKE OF THE ACTUATOR PADDLE SO THAT THE KIT CAN PULL THE PULL HANDLE IN SINGLE ACTUATOR STROKE.
6. ......
7. ......
8. ......

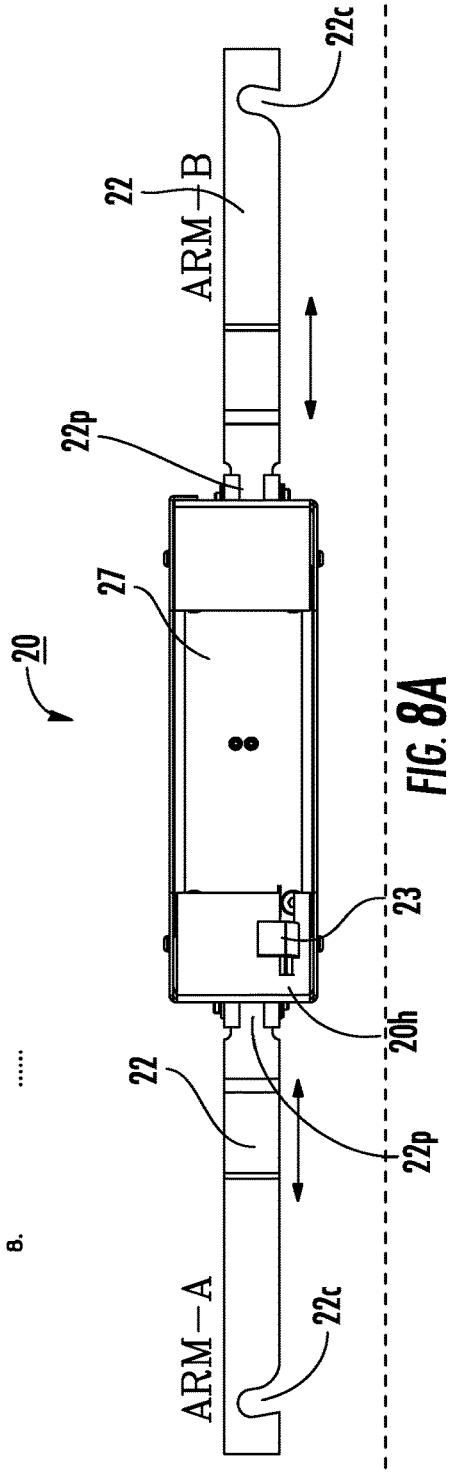

FIG. 8A

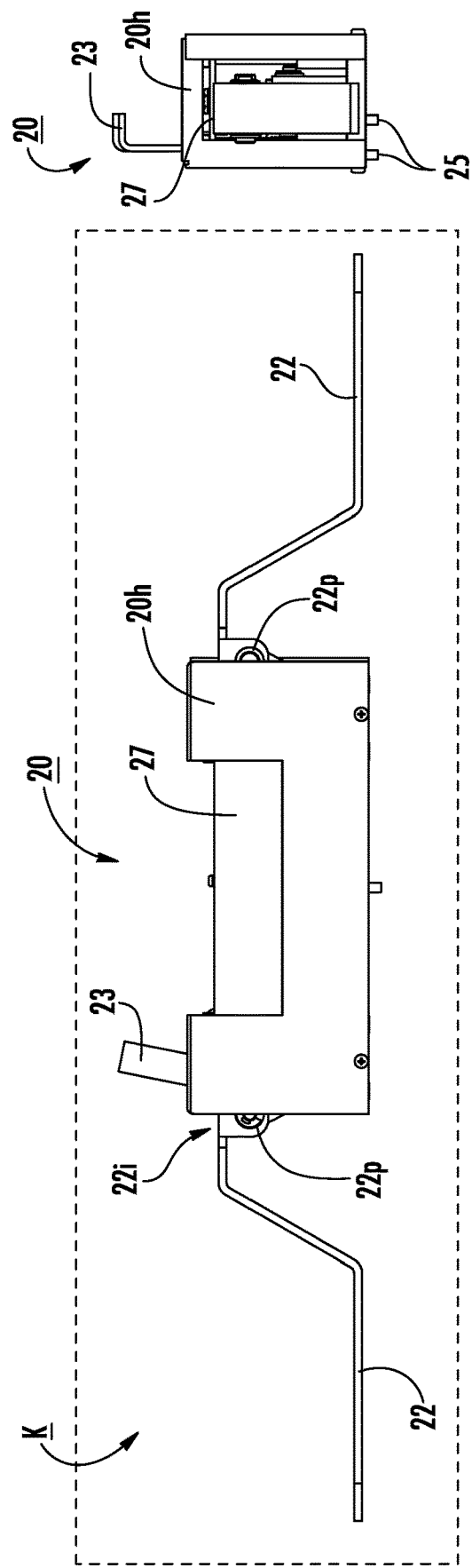

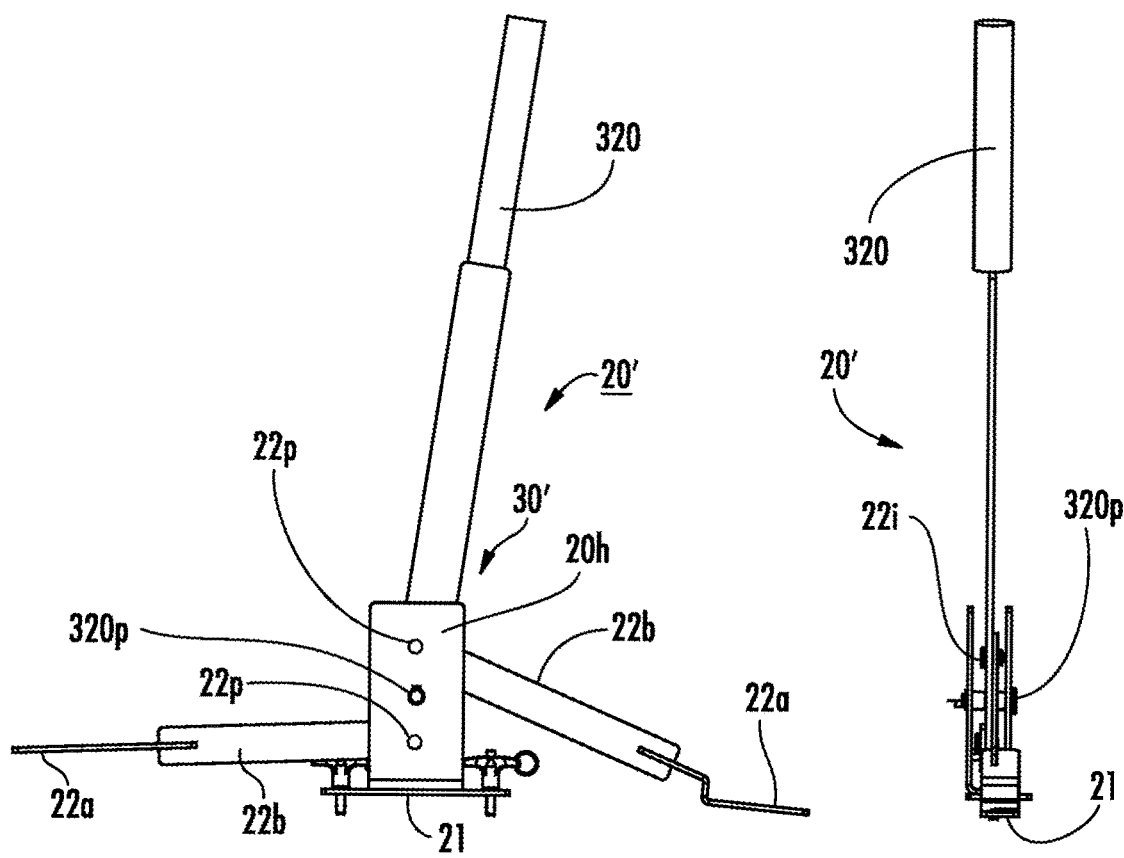
FIG. 12A
FIG. 12C
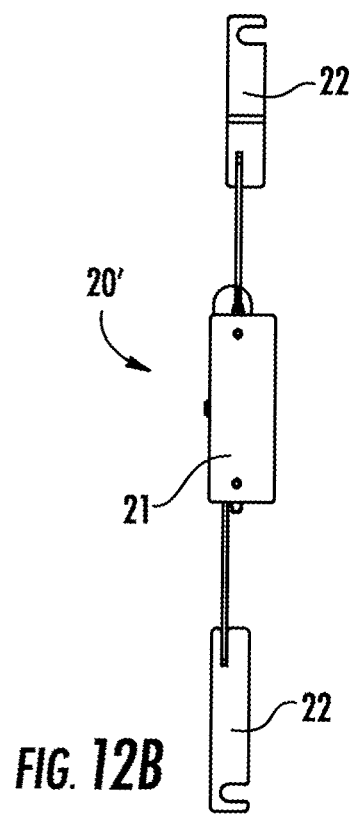
FIG. 12B

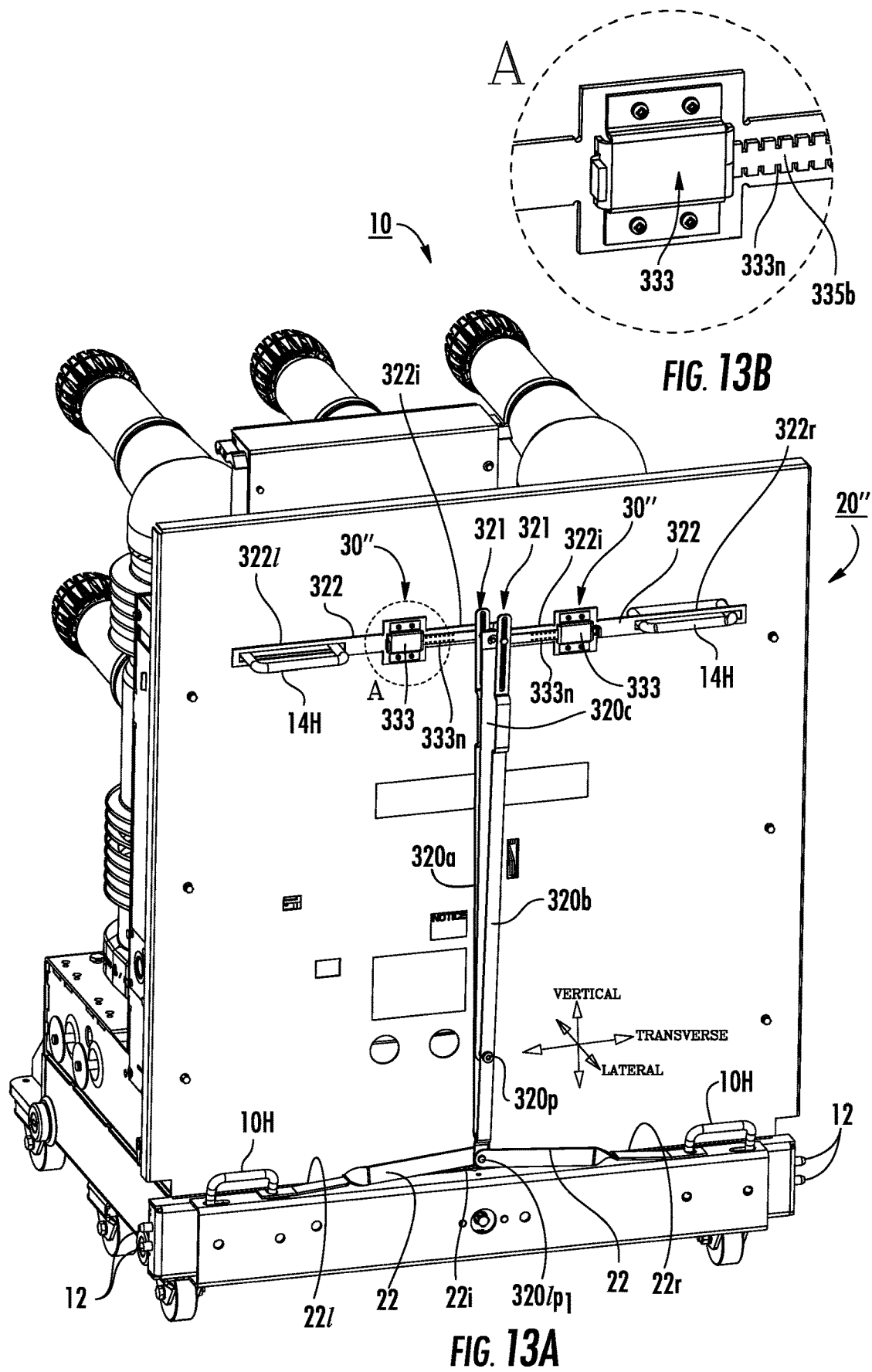

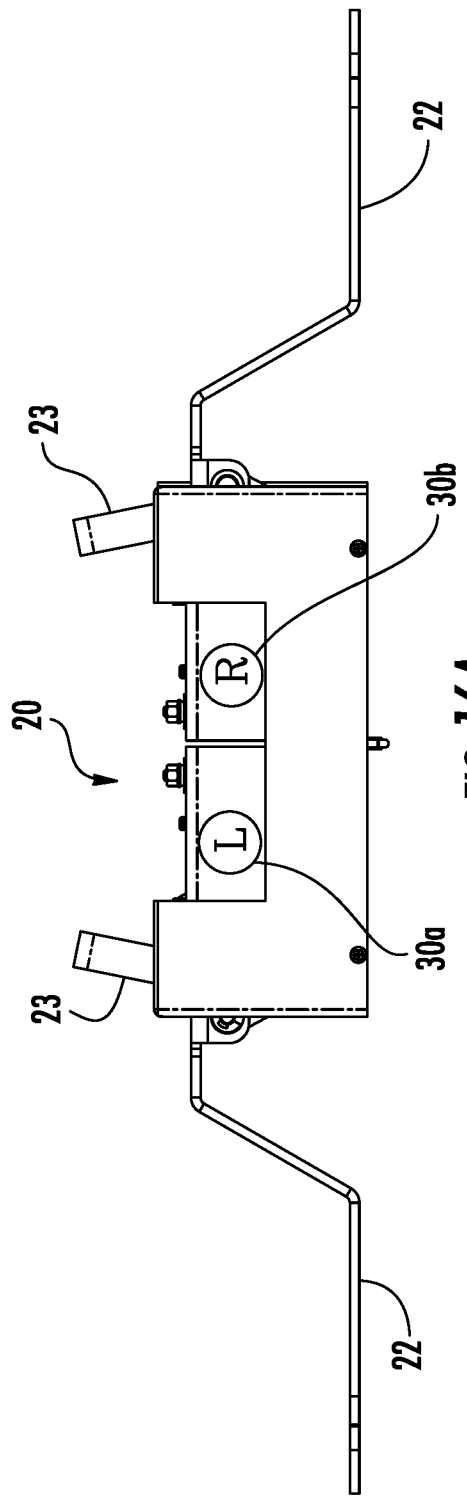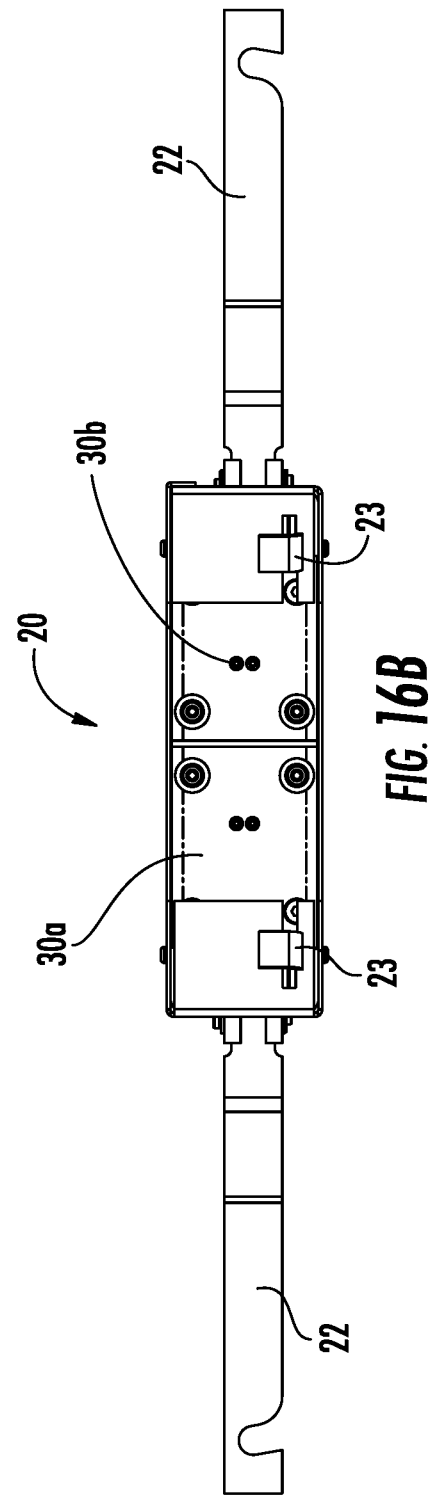

CRADLE ASSIST DEVICES AND RELATED KITS AND METHODS

RELATED APPLICATIONS

This application is a divisional of U.S. patent application Ser. No. 16/546,401 filed Aug. 21, 2019, which is a divisional of U.S. patent application Ser. No. 15/432,625, filed Feb. 14, 2017, which is a divisional of U.S. patent application Ser. No. 14/211,531, filed Mar. 14, 2014, now U.S. Pat. No. 9,607,784, issued Mar. 28, 2017, the contents of which are hereby incorporated by reference as if recited in full herein.

FIELD OF THE INVENTION

The present invention relates to draw-out components and is particularly suitable for circuit breakers.

BACKGROUND OF THE INVENTION

There are various types of circuit breakers. The circuit breakers can have a subunit housing known as "breaker cradles" or "cradles" or "truck". The breaker cradles can be Roll on the Floor (ROF) breakers, which are associated with so-called "draw out breakers." An example of a prior art ROF breaker is shown in FIG. 1. The ROF breakers that can be configured to roll into a cell or switchgear for engaging with electrical circuit components in an operative position.

Breakers are available in various sizes typically as small, medium and large units with arc extinguishing units such as vacuum interrupters, e.g., low, medium or high voltage circuit breakers. The weight of these units can range from a few pounds to a few thousand pounds. The breakers can be used in a number of utility, commercial, industrial and residential environments including distribution stations, main stations, power plants, shops and offices, commercial buildings, industrial production facilities and the like, as is well known to those of skill in the art.

The breaker cradles are typically levered-in to be positioned in a desired location in a housing, e.g., drawn into and/or lifted onto elevated rails, then racked into a switchgear or other device, for example. As shown in FIG. 1, the breaker cradles have a base 10B with externally accessible, lower handles 10H. Typically, two people are needed to release or engage an interlock using the lower handles and push the breaker inside from DISCONNECT position to the TEST position. That is, one person on one side and another on the other side, must bend over and pull the respective handle inward to release the interlock or latch or lock to allow the breaker cradle to be removed from the switchgear, contactor or other device or to be pushed in the switchgear DISCONNECT position or to the TEST position.

SUMMARY OF EMBODIMENTS OF THE INVENTION

Embodiments of the present invention are directed to breaker cradles configured to allow single user operation for release and interlock/lock/latch of a cradle.

Embodiments of the invention are directed to breaker cradles. The breaker cradles include: (a) a breaker cradle housing having a base with at least one right lock member and at least one left lock member configured to be able to retract and extend from the base between a lock position and an unlocked position; and (b) a cradle-assist assembly attached to the breaker cradle housing and/or base or residing at least partially in the breaker cradle housing and/or base. The cradle-assist assembly includes at least one actuator configured to translate the at least one right and the at least one left lock members from the lock position to the unlocked position in response to input from a user.

The base can include externally accessible right and left handles in communication with respective at least one right and left lock members. The handles can be configured to travel in respective slots in the base. The cradle assist assembly can have a left transverse member and a right transverse member that attach to respective left and right handles of the base and can be in communication with the at least one actuator to apply a force sufficient to laterally translate the at least one right and left lock members between the lock and unlocked positions.

The at least one actuator can be configured to translate (e.g., downward or in another defined direction) in response to a force applied thereto.

In some embodiments, downward movement of the at least one actuator can pull the right and left transverse members attached to the right and left handles inward toward the at least one actuator to retract the right and left lock members to reside at least partially inside the base relative to an extended operative lock position.

The at least one actuator can be a single, manually operative foot actuator that concurrently pulls the right and left transverse members inward.

The at least one actuator can include a manually operative hand actuator.

The at least one actuator can include at least one automated (e.g. electrically, pneumatically or hydraulically etc.) actuator.

The at least one actuator can include first and second manually operative foot actuators that pull respective right and left transverse members inward and push respective right and left transverse members outward to carry out the lateral translation of the at least one right and left lock members.

The cradle assist assembly can include a housing that holds inner end portions of the right and left transverse members and is releasably attached and/or affixed to a medial portion of an upper surface of the base.

The breaker cradle can optionally be a Roll On the Floor (ROF) circuit breaker with a plurality of wheels extending below the base.

The left and right transverse members can each have a flat segment that resides against or proximate an upper surface of the base with a respective end portion that engages an arm of the respective right and left handles.

The cradle assist assembly can include a housing with a lower base plate configured to attach to the breaker cradle, an upper actuator plate residing in the housing above the upper base plate, a right clevis and a left clevis attached to the base plate residing under the actuator plate, and a right pivot attachment member pivotably attached to the right clevis and a left pivot attachment member pivotably attached to the left clevis. The right and left pivot attachment members can be pivotably attached to inner end portions of respective right and left transverse members. The right and left pivot attachment members can cooperably engage the actuator plate to pivot in response to movement of the actuator plate to retract and extend the transverse members.

The breaker cradle assist can include a lock held in the housing in communication with the actuator plate or transverse members (directly or indirectly) and an externally accessible release member. The lock can be configured to inhibit the actuator plate from translating until the release member is in a release position.

Inner end portions of the right and left transverse members can be pivotably held in a housing to be adjustable laterally and/or resiliently float in a front to back direction on the breaker cradle to thereby accommodate different handle configurations and dimensional variations due to manufacturing tolerances.

The cradle assist assembly can include left and right transverse members that attach to left and right handles on the base, and a housing that holds inner end portions of the right and left transverse members. The housing can be releasably attached and/or affixed to the base and/or a front surface of the breaker cradle. The at least one actuator can include an upwardly extending handle that is attached to the left and right transverse members and can be configured to pivot in a right or left direction to cause the lateral translation of the right and left transverse members.

The breaker cradle and/or breaker (usually breaker chassis) can have upper and lower right and left externally accessible handles (usually these upper handles are attached to the chassis of the breaker and protrude out of the breaker front cover). The cradle assist assembly can include upper right and left mounting members that attach to respective upper right and left handles. The assembly can also include lower right and left transverse members that attach to respective lower right and left handles. The at least one actuator can include a left actuator attached to the upper left mounting member and a second right actuator that is attached to the upper right mounting member.

The breaker cradle assist can include a plurality of downwardly extending members attaching the upper and lower members. The right and left actuators can be configured to laterally slide along respective upper right and left mounting members to extend and retract the lower right and left transverse members.

The plurality of downwardly extending members can include a center member that is attached to both inner ends of the right and left upper mounting members and that resides a distance above the lower right and left transverse members. The members can include a left member attached to (i) the left upper mounting member, (ii) a lower end portion of the center member at a pivot joint and (iii) the left lower transverse member. The members can also include a right member attached to (i) the right upper mounting member, (ii) the lower end portion of the center member at a pivot joint, and (iii) the right lower transverse member.

The cradle assist assembly can be releasably attached to the breaker cradle and has a foldable storage configuration.

Some embodiments are directed to a retrofit kit for a breaker cradle, the breaker cradle having a base with right and left handles that communicate with retractable/extendable lock members. The kit including a cradle assist assembly that releasably engages or attaches to a breaker cradle. The cradle assist assembly can have at least one actuator attached to right and left transverse members. The right and left transverse members can be configured to engage respective right and left handles of the breaker cradle to thereby allow retraction of the right and left handles using a single person/operator.

The cradle assist assembly can either (i) be configured to releasably engage the breaker cradle and have a foldable storage configuration or (ii) have a housing that mounts to the breaker cradle base and can have an actuator plate that translates to cause movement of the transverse members to thereby extend and retract the lock members.

Still other embodiments are directed to methods of releasing retractable lock members in communication with laterally translating handles, from engagement with a switchgear, circuit breaker or contactor. The methods include manually deploying at least one actuator to pull the lower handles on a breaker cradle laterally inward to thereby release the lock members from engagement with the switchgear, circuit breaker or contactor. Optionally, the manually deploying can be carried out by accepting foot depression of an actuator plate in a housing residing on the base of the breaker cradle.

Yet other embodiments are directed to a cradle-assist assembly. The assembly includes: (i) first and second transverse members configured to attach to first and second handles of a breaker cradle; and (ii) at least one actuator mechanism attached to the first and second transverse members configured to translate the first and second transverse members a distance inward and a distance outward in response to input from a user.

The assembly can be a cradle-assist tool that is releasably attached to a breaker cradle.

The assembly can be configured as a field installable kit.

The assembly can include a housing that is configured to be attached to base and/or front of a breaker cradle.

The assembly can be for ROF breaker cradles.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 3A is a side perspective view of a cradle assist assembly on the breaker housing with an alternate handle connector and actuator configuration and with the lock members and handles extended (pushed outward) according to embodiments of the present invention.

FIG. 3B is a side perspective view of the cradle assist assembly shown in FIG. 3A but with the lock members and handles pulled inward and the actuator depressed (pressed down) according to embodiments of the present invention.

FIG. 6A is a top partial assembly view of the cradle assist assembly shown in FIG. 5A in the extended (pushed or pulled-out) position according to embodiments of the present invention.

FIG. 6B is a front view of the partial assembly shown in FIG. 6A.

FIG. 6C is a side perspective view of the partial assembly shown in FIG. 6A.

FIG. 7A is a top partial assembly view of the cradle assist assembly shown in FIG. 5A in the retracted (pushed or pulled-in) position according to embodiments of the present invention.

FIG. 7B is a front view of the partial assembly shown in FIG. 7A.

FIG. 7C is a side perspective view of the partial assembly shown in FIG. 7A.

FIG. 8A is a top view of the cradle assist assembly shown in FIG. 4A.

FIG. 8B is a front view of the cradle assist assembly shown in FIG. 8A.

FIG. 8C is an end view (right side) of the cradle assist assembly shown in FIG. 8A.

FIG. 12A is a rear view of the cradle assist assembly shown in FIG. 11A.

FIG. 12B is a top view of the cradle assist assembly shown in FIG. 12A.

FIG. 12C is a side view of the cradle assist assembly shown in FIG. 12A.

FIG. 13A is a side perspective view of yet another embodiment of a cradle assist assembly, shown mounted to a breaker and with the handles and lock members extended according to embodiments of the present invention.

FIG. 13B is a greatly enlarged view of the actuator with the latch bolt shown in FIG. 13A.

FIG. 16A is a front view of another embodiment of the cradle assist assembly that includes a plurality of actuators according to embodiments of the present invention.

FIG. 16B is a top view of the cradle assist assembly shown in FIG. 16A.

DETAILED DESCRIPTION OF EMBODIMENTS OF THE INVENTION

Figure 1A:
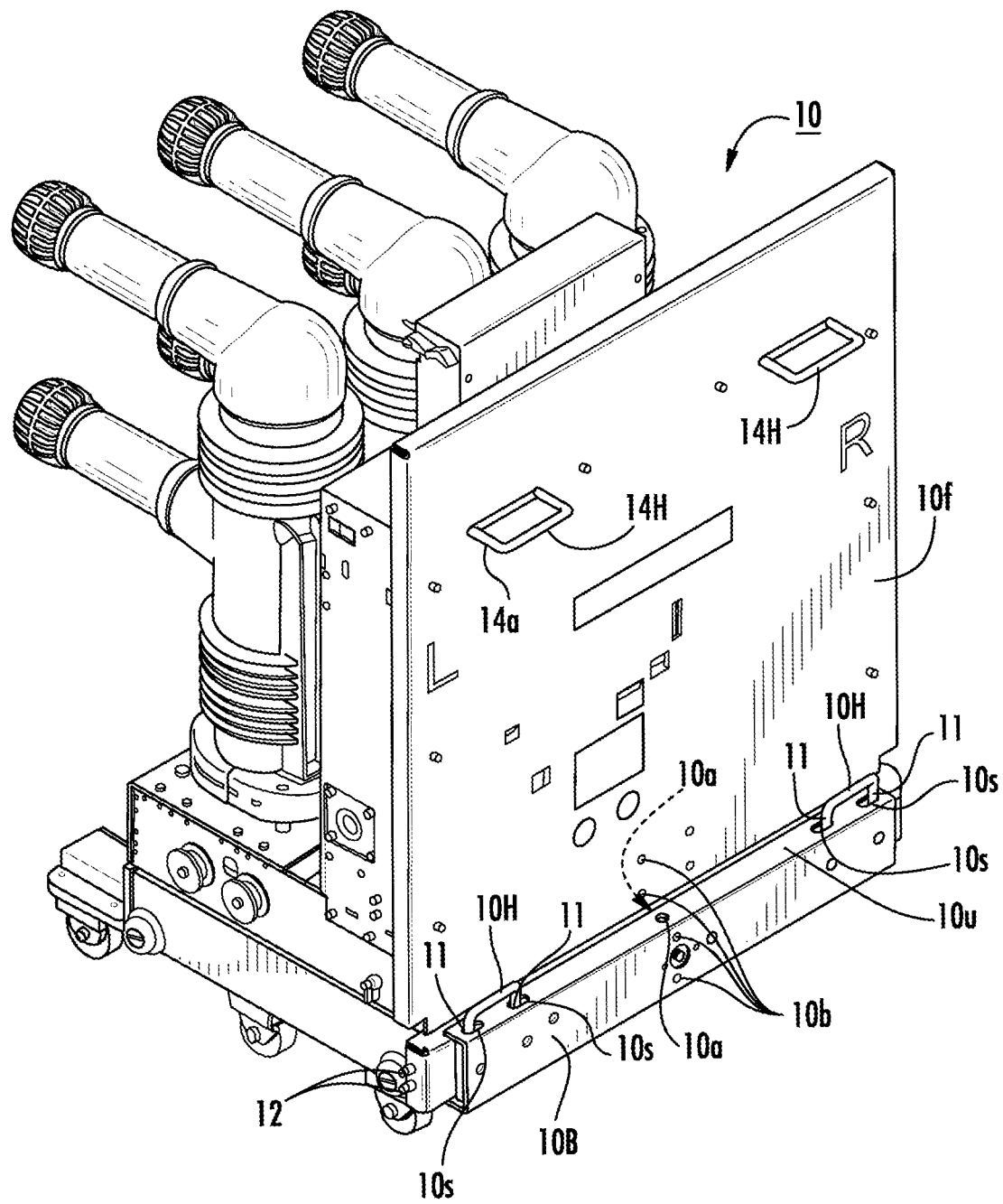
FIG. 1A is a side perspective view of a prior art circuit breaker cradle.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 20, 20', 20", 20''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Broken lines in the flow charts represent optional features or steps.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

The term "cradle" is used interchangeably with the term "breaker cradle" (and is sometimes called "a truck") and refers to a device that comprises current interrupters, typically a multi-phase switching device, a ground and test device (G&TD) or a dummy breaker configured to be movable inside a compartment or cell of an electric circuit breaker, contactor and/or switchgear. The term "cradle" is used broadly and also includes and is applicable to a "cassette" for low voltage breakers or "cradle-in-cradle" ("CIC") or "roll-in-replacement" ("RIR") configurations of a retrofit/replacement breaker solutions (FIGS. 1B, 1C, respectively) as is well known to those of skill in the art. The internal movement can comprise movement between a connected position and a withdrawn position. As is well known to those of skill in the art, in the connected (service) position, each phase of the switching device is electrically connected to a corresponding electrical conductor, while in the withdrawn (test) position each phase of the switching device is electrically separate from a corresponding electrical conductor.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 1B:
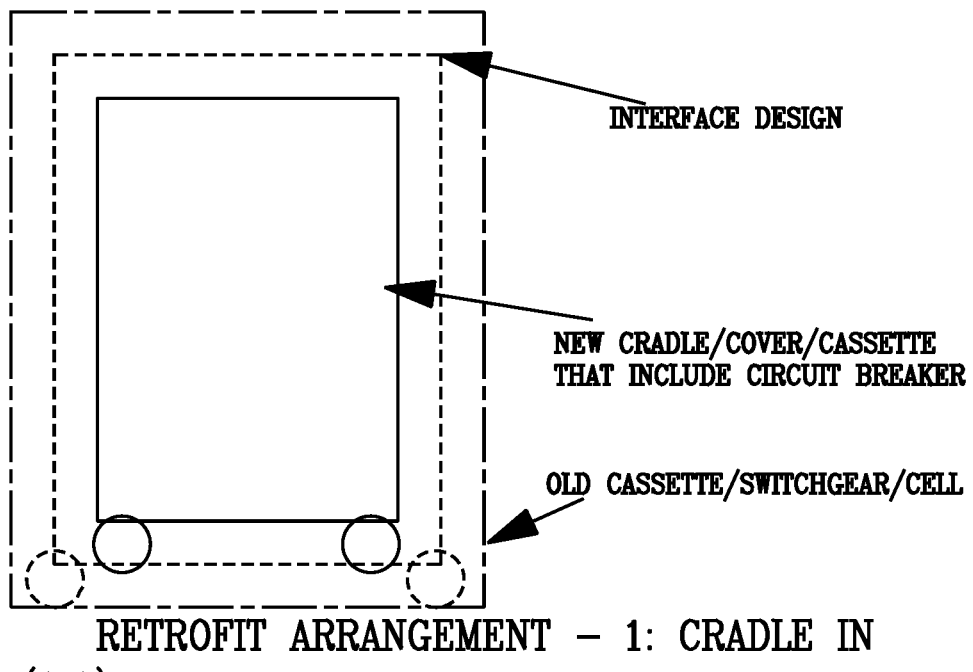
FIGS. 1B and 1C are schematic illustrations of prior art CIC and RIR breaker cradles that may be modified to use cradle assist assemblies according to embodiments of the present invention.
Figure 1C:
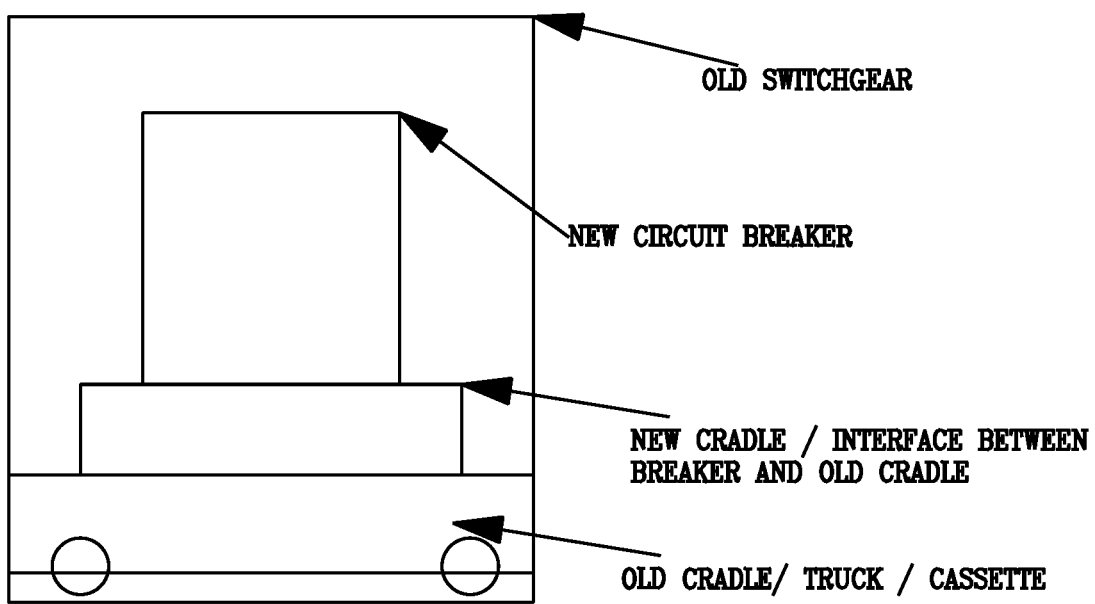
Figure 2A:
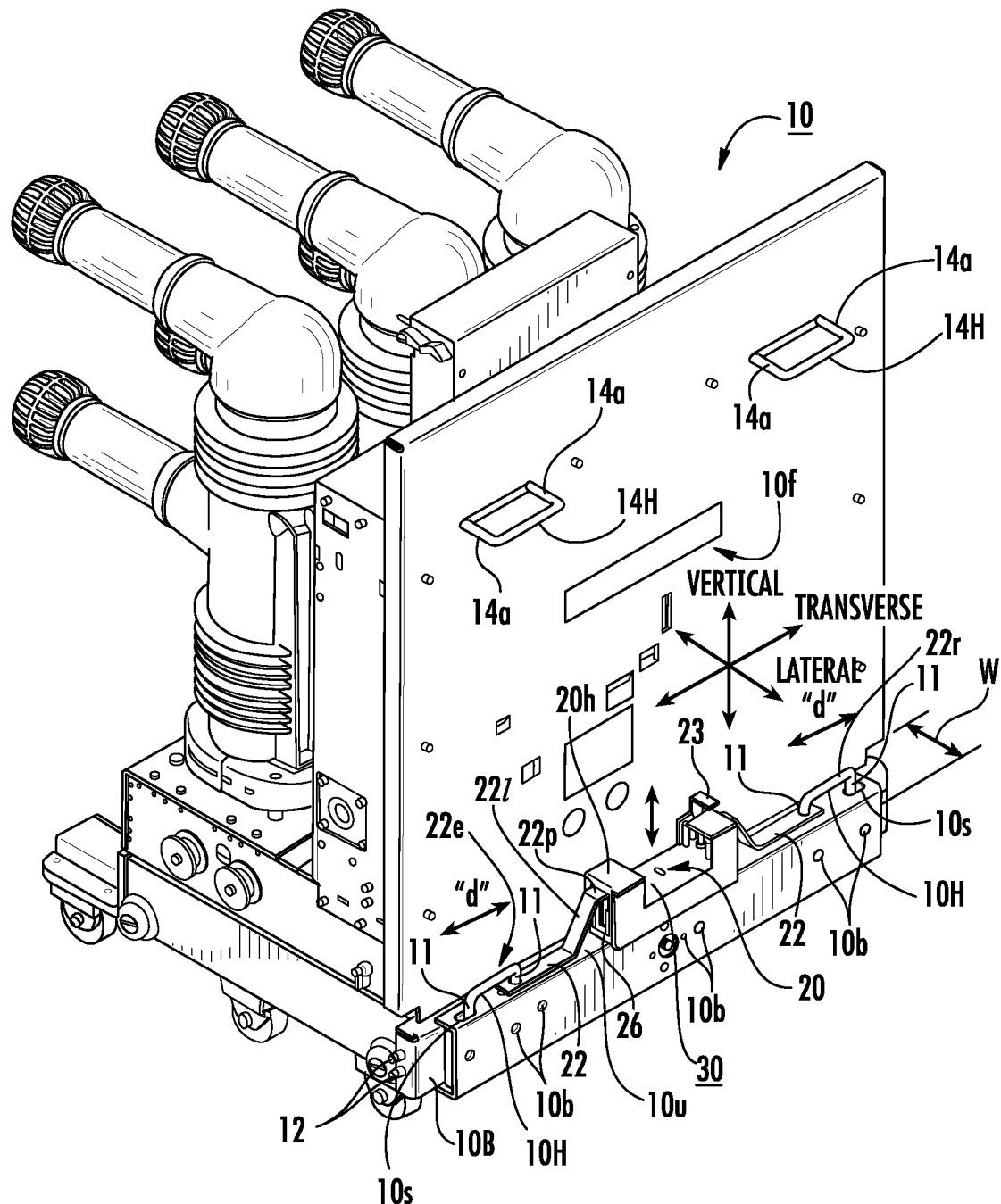
FIG. 2A is a side perspective view of a circuit breaker cradle with a cradle assist assembly and with lock members pulled inward according to embodiments of the present invention.

The terms "right" and "left" refer to the sides of the breaker when facing the front 10f of the breaker 10 as shown in the views of FIGS. 1A and 2A, for example.

The term "actuator" refers to a device that converts an applied force into action, e.g., used to apply a force that causes lock members of a breaker cradle to extend and/or retract (e.g., pull in and/or push out spring-loaded lock pins) that are used to interlock the breaker cradle in position in a cell of a housing. Typically the cell has racking rails that allow the breaker cradle to be moved in and locked/latched into position and also de-latched/unlocked to be able to withdraw the breaker cradle.

Figure 18A:
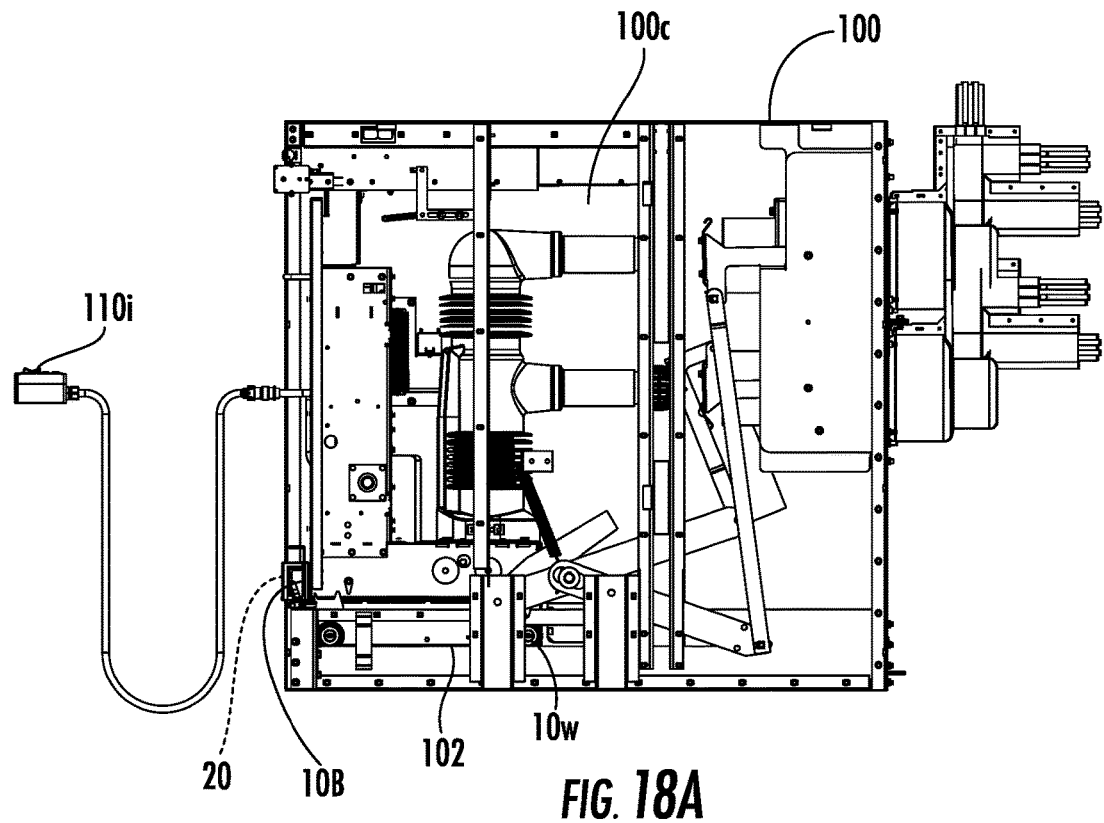
FIG. 18A is a partial cutaway side view of the contactor truck in a TEST position according to embodiments of the present invention.
Figure 18B:
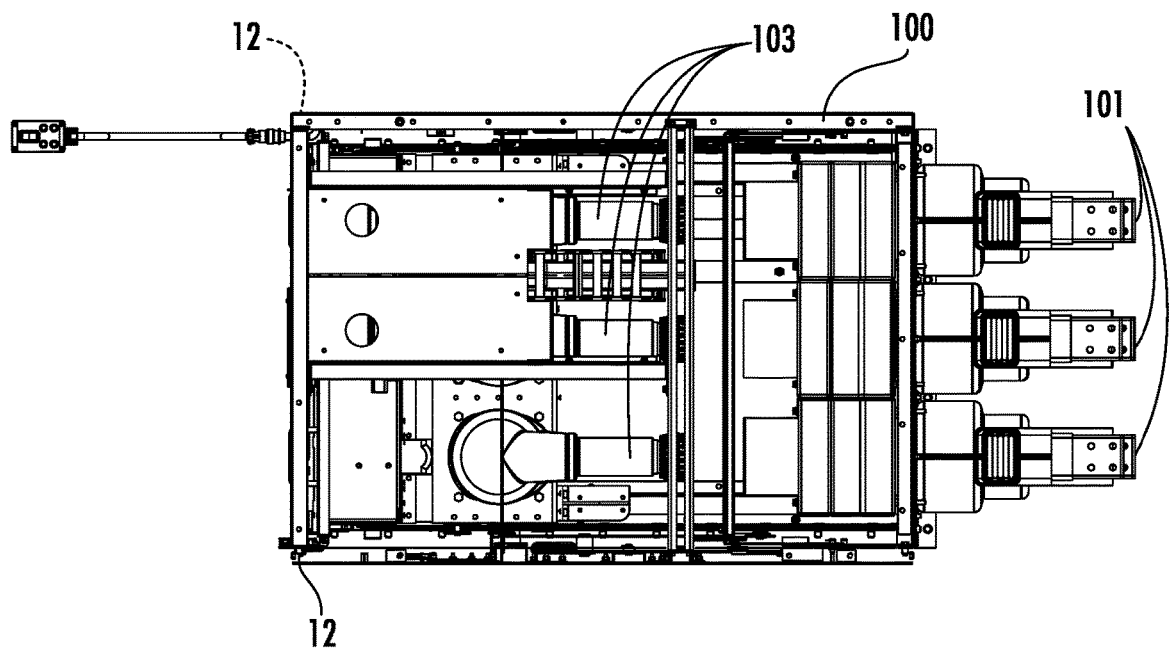
FIG. 18B is a top view of the contactor truck in the TEST position shown in FIG. 18A.

The typical racking-in operation includes the towing/rolling a breaker with the help of cradle up to the "DISCONNECT" position of the switchgear/cell by retracting and releasing the lock members 12 of the cradle 10 with cooperating members of the switchgear/cell. Further, the cradle 10 may be pushed inside to the "TEST" position of the switchgear/cell by again retracing and releasing the lock members 12 of the cradle in appropriate members of the switchgear/cell. Further, the breaker can be racked in the "CONNECT" position with the help of a racking mechanism. During the racking in from TEST to CONNECT positions, the cradle may or may not move along with the breaker inside the cell. The cell can be associated with a compartment of a switchgear, CIC, RIR retrofitted configurations of new designs or other target housing or compartment 100c (e.g., FIG. 18A) of a housing.

The term "cradle assist assembly" refers to an assembly that facilitates release and engagement of lock members of the breaker cradle that engage the cell.

Figure 2B:
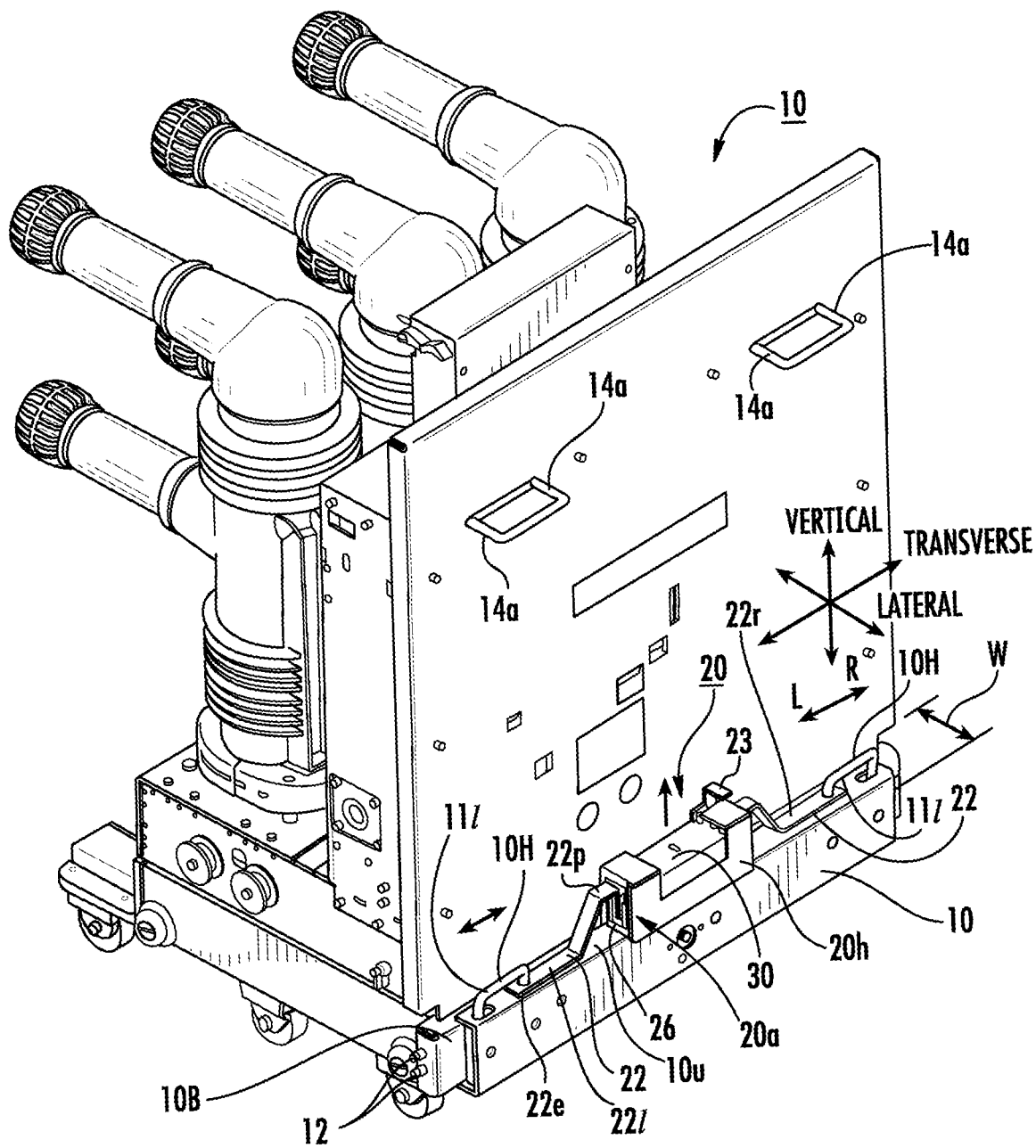
FIG. 2B is a side perspective view of the breaker cradle shown in FIG. 2A with lock members extended outward according to embodiments of the present invention.

Referring now to the figures, FIGS. 2A and 2B illustrate a cradle assist assembly 20 attached to the interlock release members, typically handles 10H, of the cradle 10. The handles 10H can be upwardly extending, e.g., so that arms 11 extend upward as shown. However, it is contemplated that other handle orientations may be used, including an outwardly extending arm 14a orientation of the upper handles 14H, for example. It is also contemplated that the new cradle assist assembly 20 can cooperate with internal features or other components to directly or indirectly latch and de-latch (translate) the at least one lock member 12 and obviate the requirement of the handles 10H to latch and de-latch (extend and retract) the at least one lock member 12. This may be particularly true for "new builds" with integrated or modified release and latch configurations using a cradle assist assembly, rather than field retrofit of existing breaker cradles with cradle assist assemblies.

The at least one lock member 12 may laterally extend and retract as shown in FIGS. 2A and 2B, for example. The at least one lock member 12 may be configured to extend and retract in other orientations such as vertically or inwardly or even at an angle or in other orientations to move between locked/latched/interlocked and unlocked/de-latched and non-interlocked positions. More than one lock member 12 may be used, and the lock members can have the same or different lock configurations and/or operational orientations. A respective extended position can be for a locked/latched/interlocked configuration (all interchangeably used to refer to a "locked" configuration) and a retracted position can be for an unlocked/de-latched/non-interlocked configuration (all interchangeably referred to as an "unlocked configuration"). However, the at least one, typically at least two, lock members 12 can operate in the reverse to have an extended unlocked position and a retracted locked position.

Figures 2C, 2D:
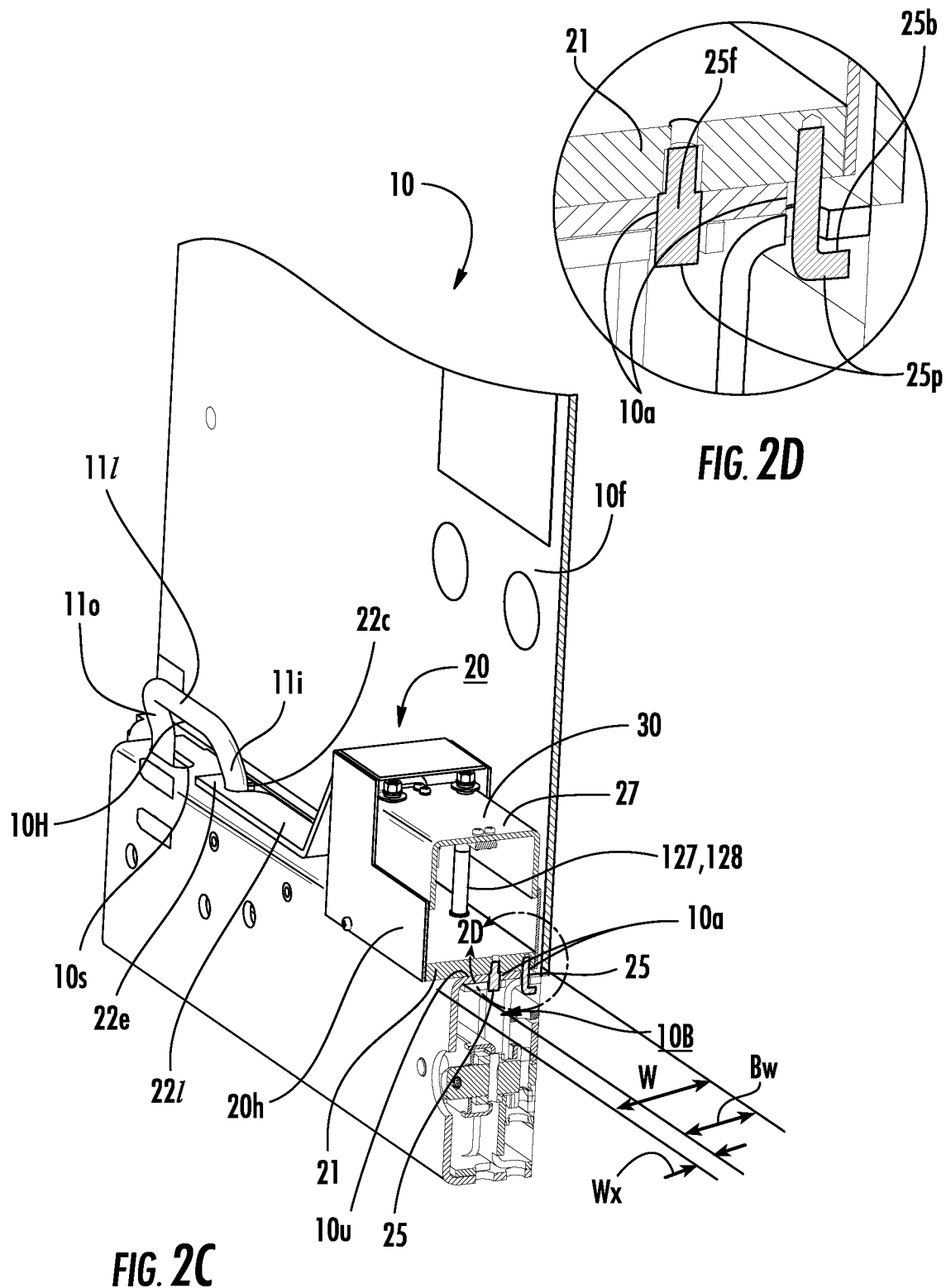
FIG. 2C is a partial cutaway view of the cradle assist assembly shown in FIG. 2B illustrating an exemplary attachment to a breaker housing according to embodiments of the present invention.
FIG. 2D is a greatly enlarged view of detail 2D shown in FIG. 2C according to embodiments of the present invention.

As shown in FIGS. 2A-2C, the cradle assist assembly 20 includes a plurality of cradle assist members 22, which includes at least one (shown as a single) right member 22r and at least one (shown as a single) left member 22l that attach directly or indirectly to the lock members 12, shown via respective right and left handles 10H. The right and left members 22 may be configured as "transverse members" that extend in a lateral or transverse direction (side to side or back to front). The member 22 may be defined as any physical member, e.g., unitary arm or an arm of a plurality of attached components, e.g., a link or links that connect to the handles 10H. These members 22 may transfer force from at least one actuator 30 to the handles 10H to actuate to latch/lock or de-latch/unlock a particular latch/lock/interlock configuration. The members 22 can comprise flexible, rigid or semi-rigid levers or arms, as shown, or may comprise cables, rods, rope, plates or other devices or combinations of devices. The right and left side members 22r, 22l can have the same or different lengths, shapes, configurations and/or sizes. In the embodiment shown, an outer end portion 22e of a respective member 22 can extend over an arm 11 of a respective handle 10H.

As shown in FIG. 2C, the end portion 22e of the member 22 resides between pairs of arms 11 of the handle 10H and has a connector segment 22c that contacts the outer surface of the inner arm 11i to be able to push and pull the handle 10H to carry out the extension and retraction of the lock members 12. However, the members 22 may be configured to attach to the lock members 12 via the handles 10H or without the handles 10H in other ways. For example, the cradle assist members 22 can engage the outer arm 11o or both arms 11o, 11i of respective handles 10H and/or may attach to the long side of the handle above the arms (not shown). The connector segment 22c can have various configurations, shown as a slot or notch on the inside long perimeter of the transverse member. For example, the notch can be reversed to reside on the outside long perimeter. The connector 22c can be integral with the transverse member 22 or may be a separate component attached to the transverse member 22. For the latter, the connector 22c may comprise a flexible, rigid or semi-rigid strap, buckle, collar, or other attachment member or configuration.

The cradle assist assembly 20 can releasably or more permanently attach to the base 10, typically using attachment members 25 such as pins and/or screws 25p that can be sized and configured to enter pre-existing holes, such as one or more holes or apertures 10a extending through a top horizontally extending upper surface 10u of the base (FIG. 1). In some embodiments, the cradle assist assembly 20 can mount to a front surface 10f or to the base 10B via front facing holes 10b (FIGS. 2A and 2B) or combinations of the upper apertures and the side front facing holes 10a, 10b, respectively.

In some embodiments, clamps, adhesive, straps, VELCRO (loops and hooks), belts, or other attachment devices may be used to attach the cradle assist assembly 20 to the base 10B and/or front 10f of the breaker 10. In other embodiments, the cradle assist assembly 20 need not be affixed to the base 10B or the breaker 10 at all, but can releasably engage the handles 10H, when needed (not shown).

In some embodiments, the cradle assist assembly 20 can be configured to interchangeably, releasably mount to different breaker cradles of different or the same configuration as a "universal" tool that can be used across multiple breaker manufacturers for cradle assist maneuvers when needed. That is, the cradle assist assembly 20 can be configured to accommodate different handle strokes 10H or spacings for different breaker cradles having the same or similar racking cradle systems even for different styles, manufacturers or voltage ratings, retrofit or newer designs.

In the embodiment shown in FIGS. 2A-2C, the cradle assist assembly 20 has a housing 20h that resides on an upper surface of the base 10u. As shown in FIG. 2C, pins 25p can be used to attach the lower surface of the housing 20h and/or lower plate 21 to the base 10B using the base apertures 10a. The pins 25p may be inserted from the base to enter under the housing 20h or from the housing 20h to enter apertures 10a in the top of the base 10B. Also, while it is preferred that existing base apertures 10a, 10b be used for mounting the cradle assist assembly 20, additional mounting apertures may be formed in the housing of the cradle 10 (either a front wall 10f or base 10B) to accommodate some cradle assist assembly 20 configurations (not shown).

FIGS. 2C and 2D illustrate that the pins 25p can be pre-installed in a lower plate 21 of the cradle assist housing 20h to extend below the housing 20h. The pins 25p can be aligned with the upper surface apertures 10a to slidably enter those two apertures and lock into position. The back pin 25b may have an "L"-like shape to facilitate alignment and positioning of the front pin 25f. In other embodiments, a single pin or a single screw may be used or other attachment configurations, such as those described above.

As also shown in FIGS. 2A-2C, the transverse members 22 can reside on the upper surface of the base 10u so as to be able to slide laterally to pull the handles 10H inward to retract the lock members 22 and push the handles 10H outward a distance "d" to extend the lock members 12 while the respective arms of the handles 10H reside in lateral slots 10s. This distance "d" can be any suitable distance to engage and disengage the lock members 12. The distance "d" is typically between about 0.1 inches to about 6 inches. The lock members 12 can be pins as shown in FIGS. 1, 2A and 2B, or may have different configurations that provide the desired locking engagement with the receiving component, e.g., switchgear cabinet or cell.

The cradle assist assembly 20 can include at least one actuator 30 held in a housing 20h. The actuator 30 can be configured as a linear or rotary input actuator that provides the desired translation of the transverse members 22.

The at least one actuator 30 can be configured to translate in any suitable direction or manner, shown as downward (FIG. 2A) in response to force applied to the actuator 30 by a user, either via manual force or via an automated stroke using an electromechanical member. The actuator and/or release may be operated in any direction or combinations of directions e.g., transverse, lateral, vertical as indicated by the arrows along these axes in certain of the figures.

Manual force applied when the actuator 30 is in the actuated (lower) configuration can reverse the motion and force the actuator 30 to rise such as to return to the upper position shown in FIGS. 2B and 2C. The upper actuator position can be associated with a lock member 12 extension and the lower actuator position can be associated with the lock member 12 retraction. However, the cradle assist assembly 20 can be configured to operate in the reverse, e.g., to extend the transverse members 22 and lock members 12 when the actuator 30 is pressed down and lock member 12 retraction, when raised or not depressed.

The at least one actuator 30 and/or transverse member(s) 22 can be locked/held in the respective defined breaker lock and unlock (extended and retracted) positions of lock members 12 via a cradle assist lock, until the cradle assist lock is manually or automatically released.

FIGS. 2A-2C also illustrate that the cradle assist assembly 20 can include a linkage assembly 20a held in the housing 20h attached to the transverse arms 22. FIGS. 2A-2C further illustrate that the cradle assist assembly 20 can also include at least one release member 23 (shown as an upwardly extending lever) that can be used to release an internal lock 123p (FIG. 7C) that locks the position of the arms 22 in the extended and retracted positions. The at least one release member 23 can be used to release the internal lock before allowing the actuator 30 to be actuated (in the embodiment shown, raised and/or lowered). Alternatively, the actuator 30 may be in a released position after it retracts the lock members 12; while only "lock" 123p may be released after depressing release 23.

The linkage assembly 20a can include a clevis 26 that pivotably holds the inner end portion 22i of the transverse arms 22 to allow the extended and retracted motion in response to down and up actuation, respectively, of the actuator 30.

FIGS. 2A-2C illustrate the cradle assist assembly 20 with a single actuator 30 that can concurrently pull and/or push the transverse members 22. FIG. 16A illustrates two actuators 30a, 30b, one for the right and one for the left handles 10H. Although not shown, separate actuators may be used to pull and push respective transverse members 22, although it is preferred that a single actuator be configured to carry out both push and pull functions for at least a respective one transverse member 22 to reduce component cost and reduced assembly complexity.

FIGS. 3A and 3B illustrate an alternate configuration of the handle connector 22c' and shows that the cradle assist assembly 20 can include more than one release member 23, here shown as a left and right side release member 23l, 23r for the left and right transverse members 22l, 22r, respectively.

Figure 13C:
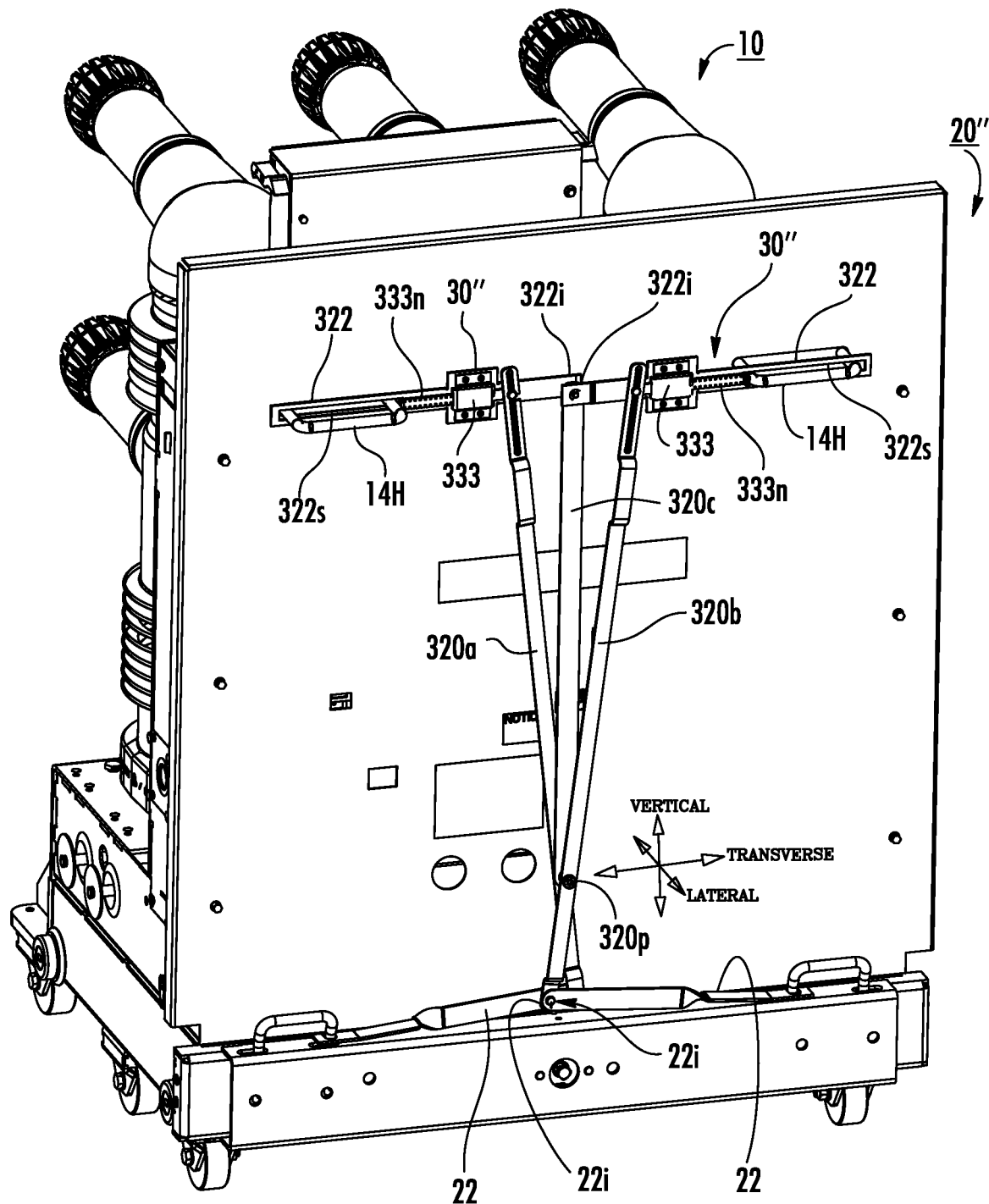
FIG. 13C is a side perspective view of the cradle assist assembly shown in FIG. 13A illustrated with the handles and lock members retracted.

In some embodiments, the at least one actuator 30 is sized and configured to be activated using a manual force applied by a single user, e.g., a single hand (FIG. 2A/2B, FIGS. 10A/10B) or a single foot of a single user (FIG. 2A/2B) or two hands of a single user (e.g., FIGS. 13A, 13B).

Figure 17A:
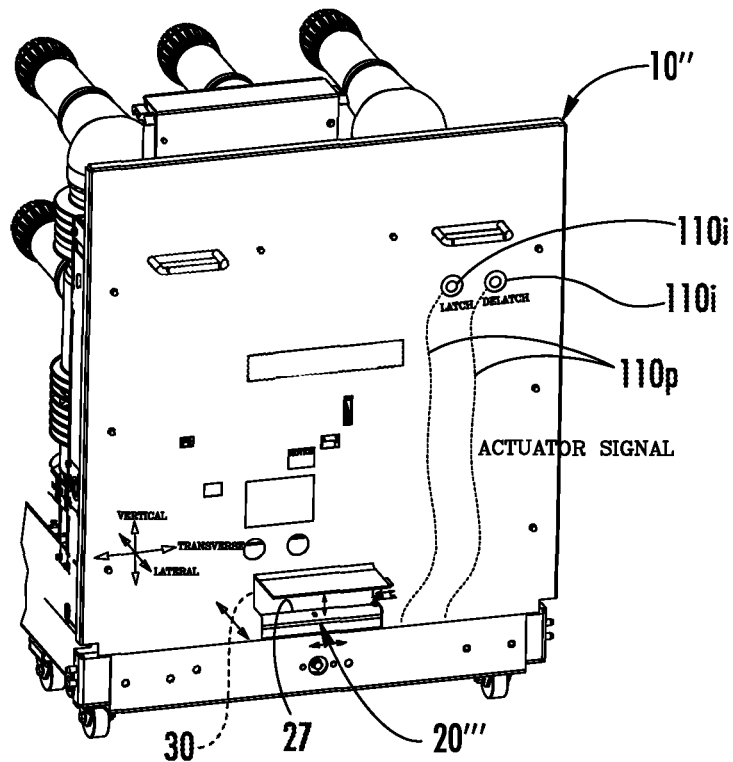
FIGS. 17A-17C are front perspective views of automated cradle assist assemblies according to embodiments of the present invention.
Figure 17B:
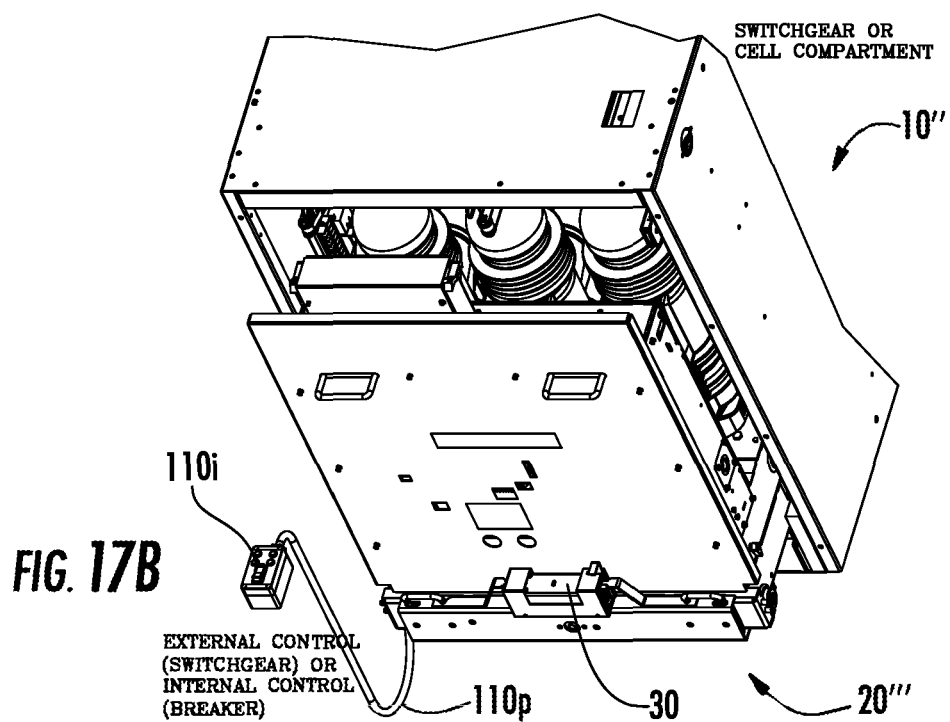
Figure 17C:
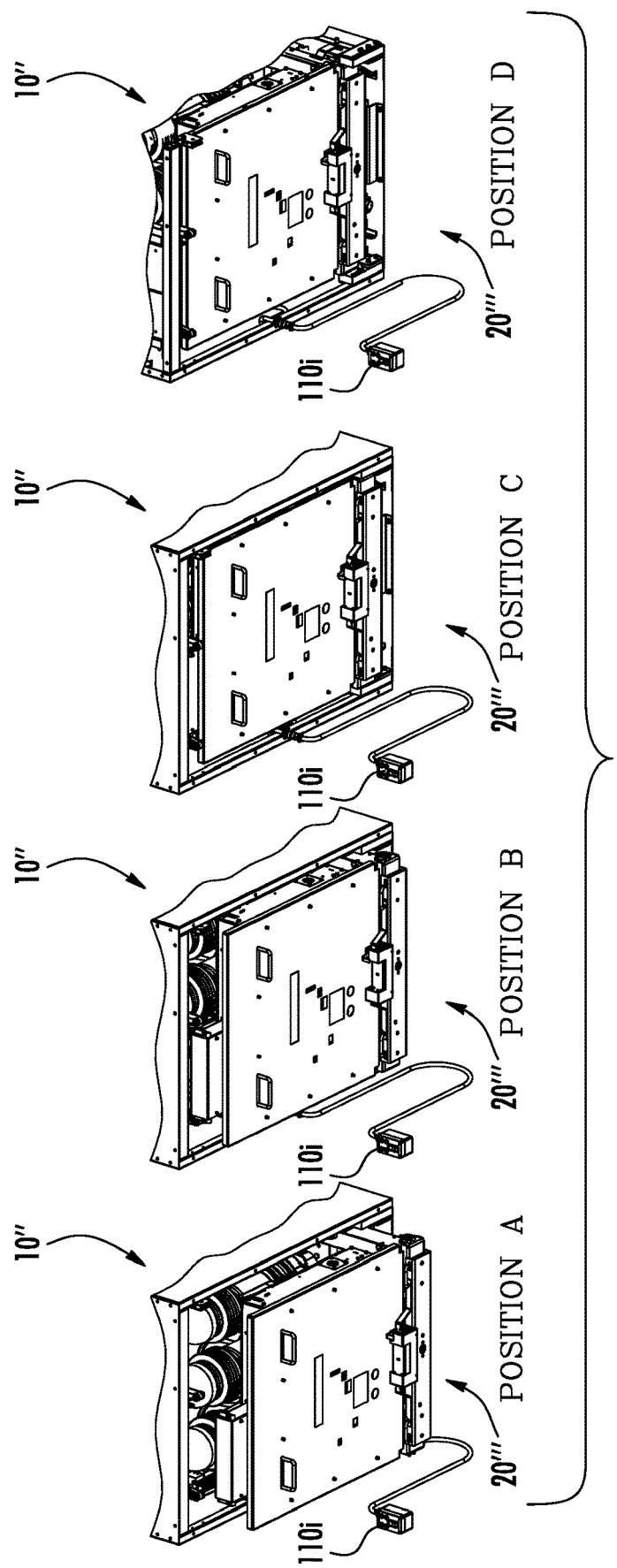

However, although embodiments of the invention are described herein for a manually applied force for actuation of the cradle assist assembly 20, the cradle assist assembly 20 may optionally be automated. The automated actuation can comprise, for example, and without limitation, use of an electromechanical device such as one or more of a pneumatic drive, hydraulic drive, electrical power (line or battery), electric motor that drives a gear or other force generating member, and/or use of a device that can operate based on stored energy (including spring energy and/or a solenoid). FIGS. 17A-17C illustrate an example of an automated cradle assist assembly 20'''.

As shown in FIGS. 2A-2C, for example, the cradle assist assembly 20 can have a relatively compact configuration and can reside proximate the base 10B of the breaker 10 with a width W that is about the same or slightly larger than the width Bw of the base 10B itself to extend a small distance in front of the base, typically within 1-5 inches of the base 10B. Stated differently, the cradle assist assembly 20 can have a maximum width difference Wx that is between about 1 inch to about 5 inches greater than the base width Bw (W−Bw). However, it may be preferred to have W≤Bw or Wx≥0. In some embodiments, Bw is less than or equal to W while in other embodiments Bw is greater than W. In some embodiments, the cradle assist assembly is not required to be compact and may occupy a relatively large foot print, volume or area, which is typically less than that of the breaker chassis or cradle.

The breaker cradle 10 can be used to mount an ROF breaker of different types, sizes and/or different voltage ratings. The breaker cradle 10 is not required to be an ROF breaker. The breaker cradles 10 can weigh between about 5-3000 pounds, typically between about 250-1200 pounds.

The breaker cradles 10 can be any voltage type or configuration for power circuit breakers. By way of example, but without limitation, the breaker cradles 10 can include medium voltage type units, e.g., between about 1 kV to about 72 kV, including, for example, about 5 kV, about 15 kV, about 38 kV and the like or low voltage type units e.g., less than 1 kV.

Figures 4A, 4B:
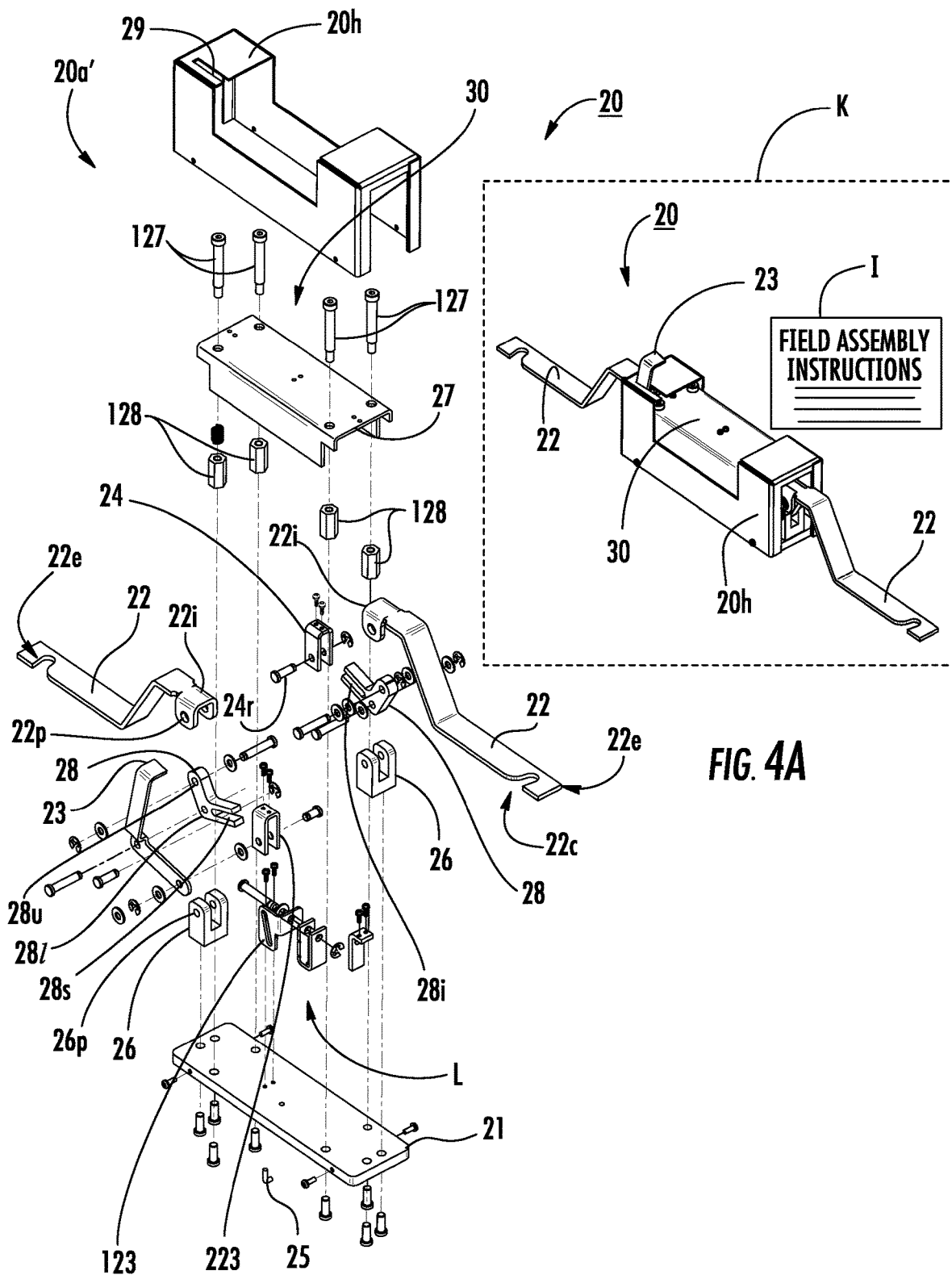
FIG. 4A is a side perspective view of the cradle assist assembly according to some embodiments of the present invention.
FIG. 4B is an exploded view of the cradle assist assembly shown in FIG. 4A.
Figure 11A:
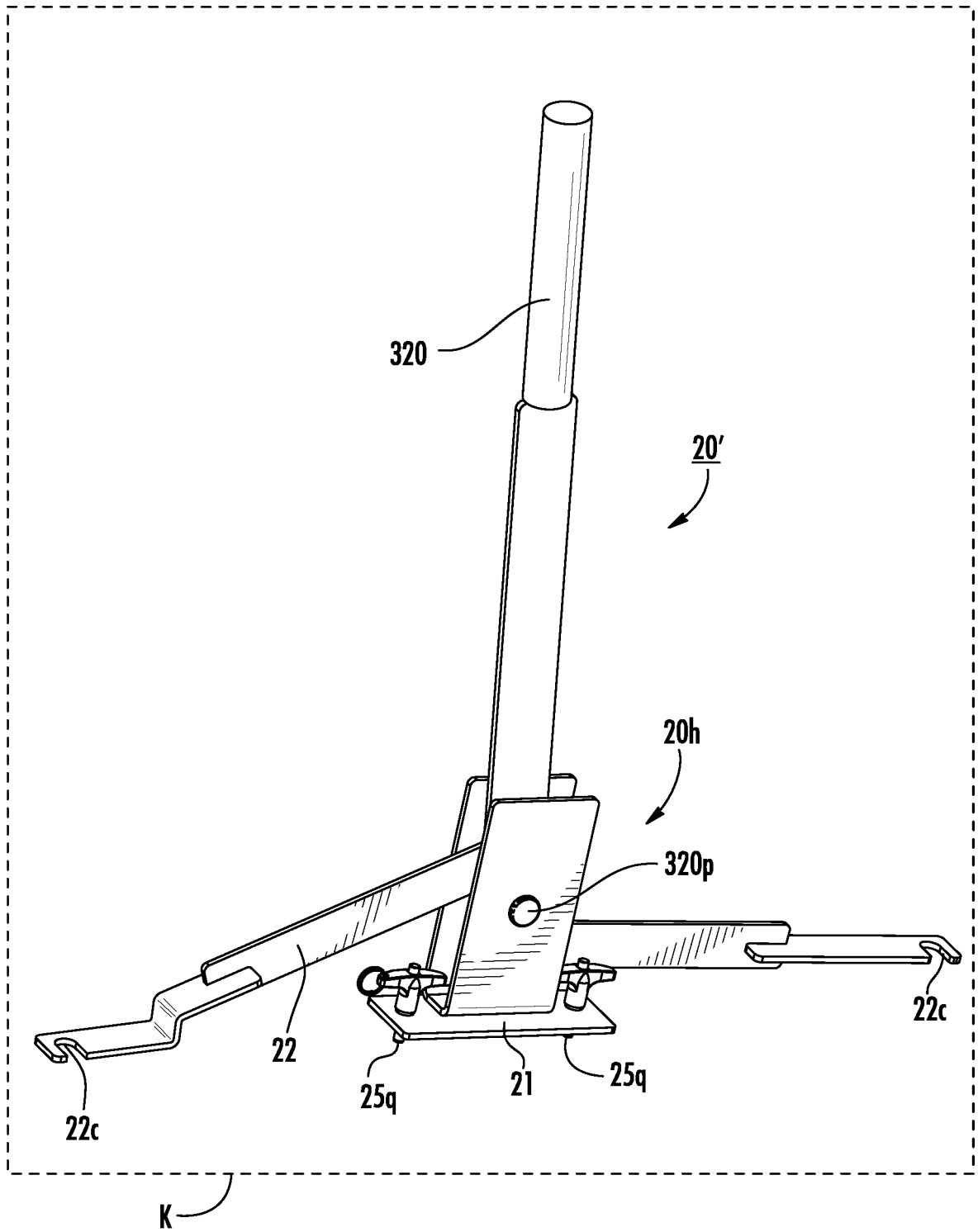
FIG. 11A is a side perspective view of the cradle assist assembly shown in FIGS. 10A and 10B.

FIGS. 4A, 8A, and 11A illustrate that the cradle assist assembly 20, 20', 20", 20'" can be provided as a kit K for field installation or retrofit or for factory assembly. The kit K may include assembly instructions I (FIG. 4A, 8A).

Figure 5A:
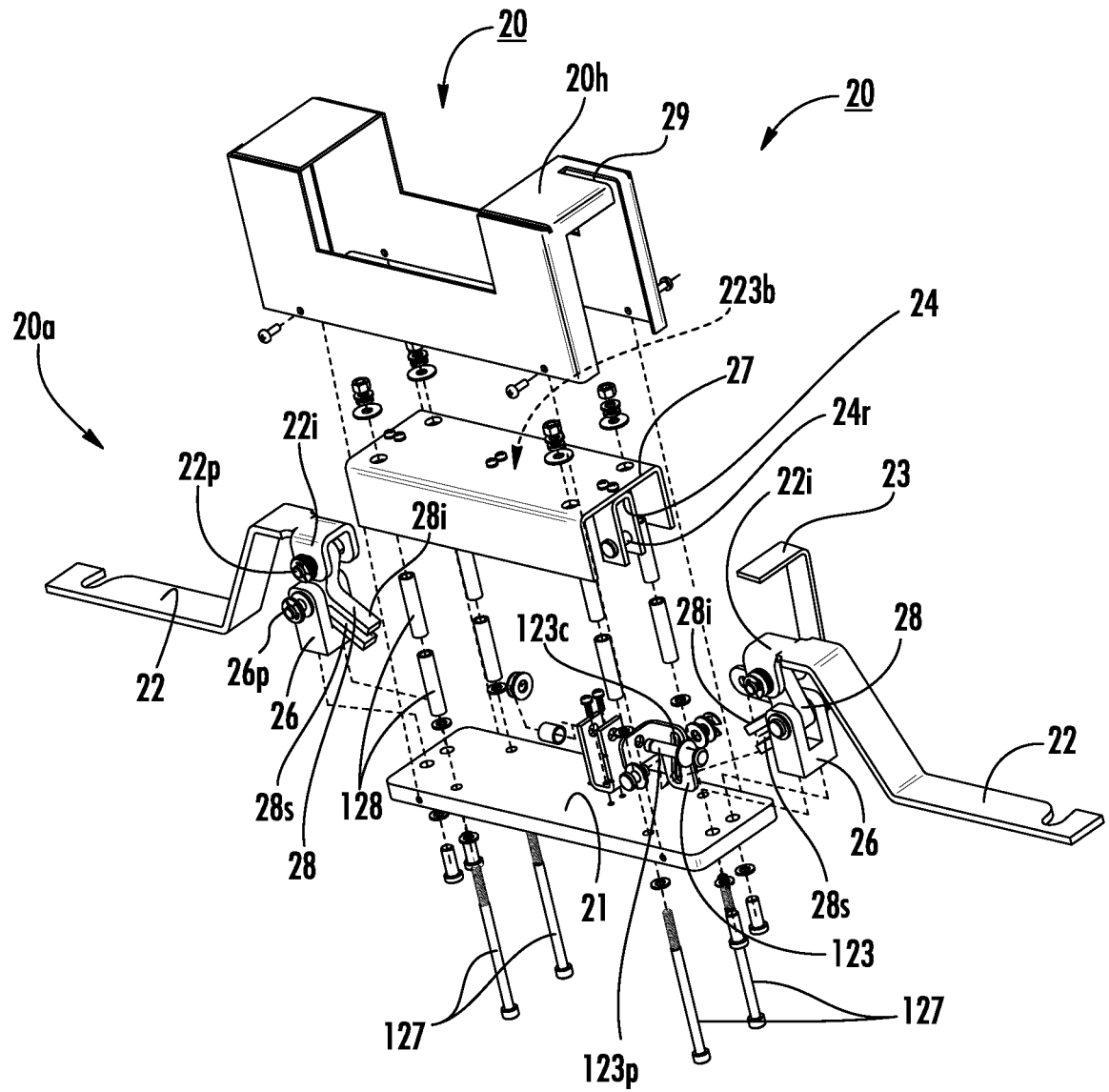
FIG. 5A is a partial exploded view of the cradle assist assembly shown in FIGS. 4A and 4B.

The cradle assist assembly 20 can comprise a linkage assembly 20a' or 20a shown in FIGS. 4B and 5A, respectively. The linkage assembly 20a, 20a' is configured to cooperate with the downward and upward motion of the actuator 30 plate 27 to cause the lateral linear motion of the transverse members 22. The linkage assembly 20a, 20a' can comprise a clevis 26 that is supported by the lower plate 21 of the cradle assembly 20 and can also include a pivot attachment member 28 that has an upper segment 28u and a lower pivot attachment segment 28l. The lower segment 28l pivotably attaches at joint 26p to the clevis 26 and the upper segment 28u pivotably attaches at joint 22p to the inner end portion 22i of the transverse member 22. The pivot attachment joints 22p, 26p can be configured to have aligned centerlines along a length of the member 28 with the pivot 22p residing above the pivot 26p both when in the extended and retracted transverse member positions. The linkage assembly 20a, 20a' can be the same or substantially the same for each side as shown, although where a single release member 23 is used, it can be attached to one of the clevis' 26 as will be discussed further below.

The pivot attachment member 28 can have an inner facing segment 28i that cooperably engages the actuator plate 27. The inner facing segment 28i can have an open channel or slot 28s formed between upper and lower inwardly extending segments. The actuator plate 27 can hold a downwardly extending bracket 24 that is attached to the inner facing segment 28i. The downwardly extending bracket 24 can hold a laterally extending pin 24r (which can also be described as a thin short rod) of any shape that extends through the channel or slot 28s of the pivot attachment member 28. Thus, the pivot attachment member 28 pivots up and down in response to the up and down movement of the actuator plate 27. This, in turn, pivots the transverse member 22 to move the transverse member outward and inward between the laterally extended and retracted positions (FIG. 2A, retracted position, FIG. 2B extended position).

In the embodiment shown, when the actuator plate 27 is in its "home" or "released" upper position associated with cradle lock member 12 extended as shown in FIG. 2B, the inner facing segment 28s is pivoted upward and the pivot 22p of the inner end portion 22i of the transverse member is pivoted downward to laterally extend the transverse member 22 (FIG. 6C). As shown in FIGS. 5A and 7C, when the lock member(s) 12 is in the retracted or pulled-in position of FIG. 2A, with the actuator 30 moved downward, the inner facing end 28i of the pivot attachment member 28 is pivoted downward while the pivot joint 22p rotates upward to reside closer to a center of the housing 20h and the inner end 22i of the transverse member 22 is thereby pulled inward.

The pivot positions 22p, 26p can be alternatively configured so that when the front end 28i of the pivot attachment member 28 pivots downward, the transverse member 22 extends outward rather than retracting inward as shown in FIG. 7C.

Still referring to FIGS. 4A and 5A, the cradle assist assembly 20 includes vertically extending mounting members 127 that extend between and attach to the actuator plate 27 and the lower plate 21. FIG. 4A shows these members as extending down and FIG. 5A illustrates the members 127 extend upward. The members 127 hold spacers 128. The actuator plate 27 can slide up and down about the vertical members 127.

Figure 6D:
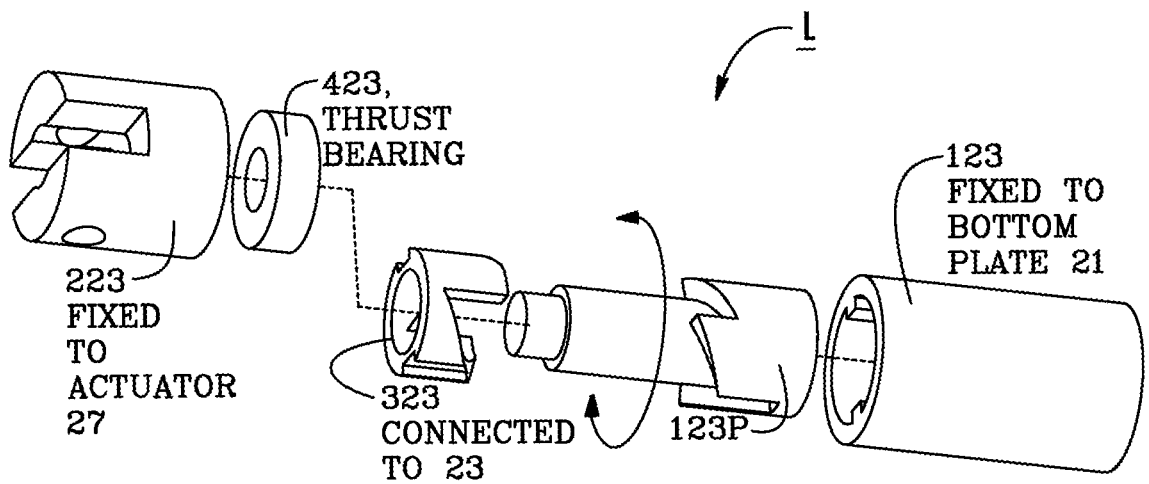
FIGS. 6D and 6E are schematic illustrations of alternative cradle assist assembly lock configurations according to embodiments of the present invention.
Figure 6E:
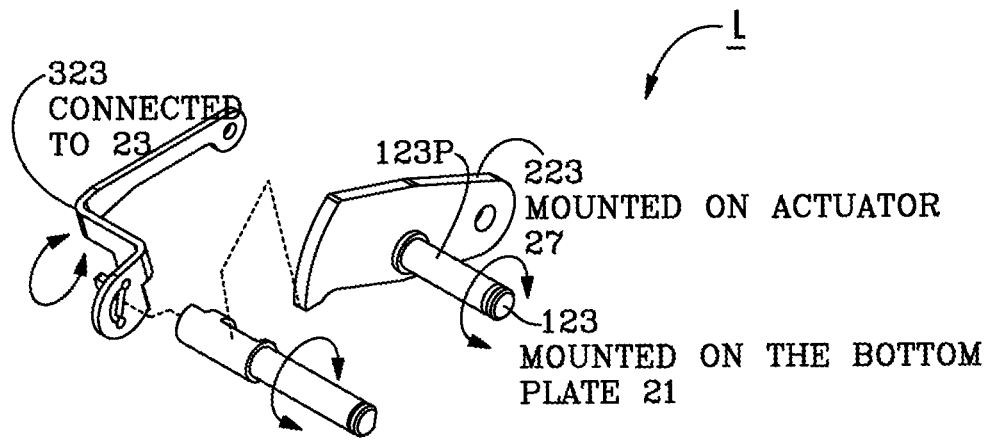

The cradle assist assembly can have an internal (actuator) lock L that holds the actuator members 22 in the retracted and extended interlock positions. FIGS. 6B and 7B illustrate an exemplary embodiment of one lock configuration. FIGS. 6D and 6E illustrate two other exemplary actuator lock L configurations. The lock L may be released by a release member 23 (FIG. 6B).

In some embodiments, the housing 20h includes at least one slot 29 that slidably holds an upper end portion 23u of the release member 23. The release member 23 can have an "L" shape (FIG. 9B) with a lower leg 23l pivotably attached at one end to the clevis 26. The release member lower portion 23l also has an inner facing opposing end portion 23e that is slidably attached to a lock member 123 that has an upwardly extending closed channel 123c. As shown, the channel 123c can angle outward as it rises from the lower plate 21. When the lever 23 is pulled outward (such as in the orientation shown in FIG. 7C), the end of the lower lever 23e is at an upper end of the channel 123c which retracts (pulls) the lock member 123 and pin 123p outward, away from the center of the housing 20h, to release the actuator lock member 223.

FIGS. 6A-6C illustrate the cradle assist assembly 20 without the housing 20h and with the extended position of the (transverse) cradle assist members 22. FIGS. 7A-7C illustrate corresponding views with the retracted position of the (transverse) cradle assist members 22 and lock members 12. The relative positions of the actuator lock member 223 relative to the locking pin 123p is shown, for example, in FIGS. 6B and 7B.

The lock member 123 can also hold a laterally extending pin 123p that cooperates with an actuator plate lock member 223 to lock the actuator plate 27, and hence, transverse member 22, in position. The lock member 223 can include a downwardly extending bracket 223b with an aperture 223a that releasably engages the pin 123p, depending on the position of the release member 23. The bracket 223b can be attached to a medial portion of the actuator plate 27. The pin 123p can be retractable responsive to movement of the release lever 23 as the lower end 23l is attached (indirectly to the pin 123p). Once in the depressed position and locked, further depression may be used to release the lock members 223, 123p and allow the actuator plate 27 to rise to its "home" or original position (FIG. 2B, for example).

However, other lock and lock release configurations may be used to lock the members 22 of the cradle assist assembly in the retracted and extended positions, including, but not limited to, a mechanical, optical or electrical switch, a ball-pen release mechanism (FIG. 6D), a push button, a spring-loaded D-shaped shaft (FIG. 6E) that can be turned to lock and release, and the like including friction lock releases, emergency brake release mechanisms, and the like.

FIG. 6D illustrates the lock L with the lock member bracket 223 which can be fixed to actuator 27 and include a thrust bearing 423. The lock member 323 can be connected to release member 23. The lock L can include the lock support 123 fixed to the bottom plate 21. The shaft or pin 123p can rotate while held in the support 123. FIG. 6E illustrates an example of a lock L configured with a "D-shaft/hatchet type lock. Lock member 323 can be connected to release member 23. The lock can include a bracket 223 that holds pin or rod 123p and is held on the bottom plate 21. In these examples, movement of the release member 23 disengages the lock L.

Figure 5B:
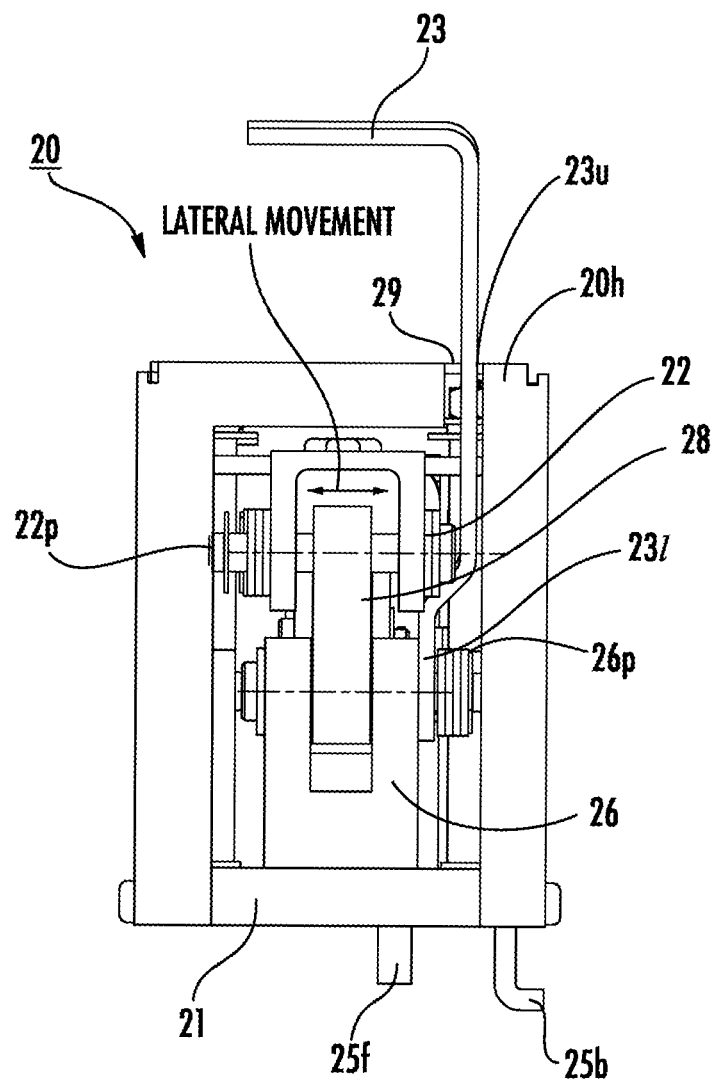
FIG. 5B is an end section view of the cradle assist device shown in FIG. 5A.

FIG. 5B is a section, end view of the cradle assist assembly 20 shown in FIG. 5A illustrating that the member 22 can be held in the housing 20h on the pivot attachment member 28 at pivot joint 22p so as to be able to have some lateral (front to back) adjustment, orthogonal to the extension and retraction direction of the lock members 12 and the members 22, to allow proper engagement of the connector 22c with a respective handle 10H. A spring, stacked dome washers, or other resilient members or couplings or other devices can be used to provide this adjustability. Thus, the transverse members (e.g., levers or arms, in some embodiments) can be pivotably held in a housing to be adjustable laterally (viewed from an end, or in a front to back direction with respect to the front of the breaker cradle 10) and/or resiliently float in a front to back direction on the breaker cradle 10 to thereby accommodate different handle configurations.

Figure 9C:
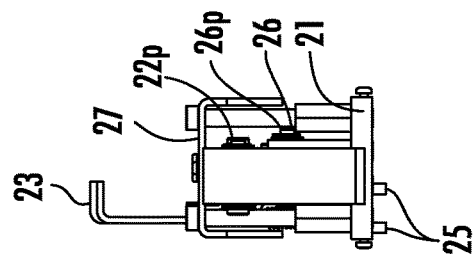
FIG. 9C is an end view (right side) of the partial assembly shown in FIGS. 9A and 9B.
Figure 9A:
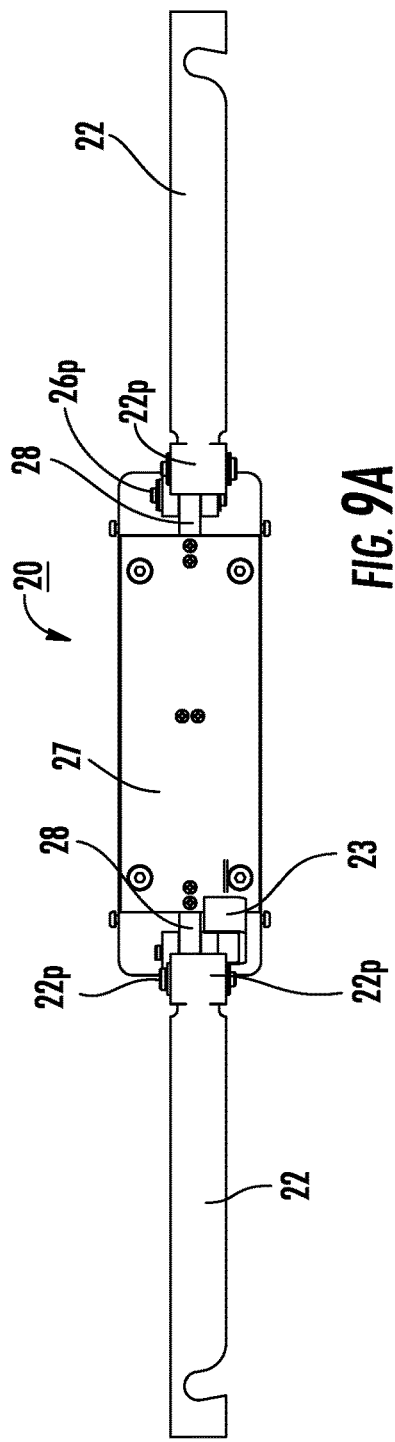
FIG. 9A is a top partial assembly view of the cradle assist assembly shown in FIG. 8A illustrating an exemplary actuator without the cover or housing.
Figure 9B:
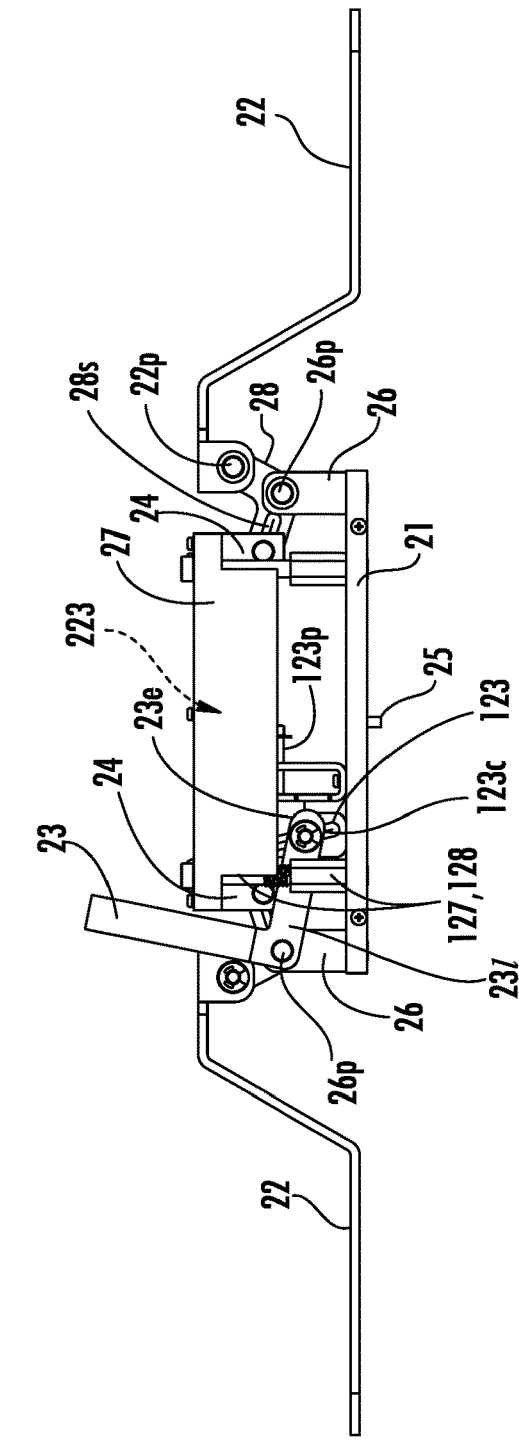
FIG. 9B is a front view of the partial assembly shown in FIG. 9A.

FIGS. 8A-8C illustrate an example of the cradle assist assembly 20 that can be provided as a field retrofit kit "K", typically in an assembled configuration, but partial assembly configurations may also be used. Assembly instructions I may also be provided. FIGS. 9A-9C illustrate the cradle assist assembly shown in FIGS. 8A-8C without the external housing or cover 20h. FIG. 9A illustrates that the pivot joints 22p, 26p can be laterally offset in the height dimension which can allow for lateral adjustment to the transverse arm 22 so as to properly cooperate or abut a handle 10H as discussed with respect to FIG. 5B.

As noted above, while the embodiments shown herein are primarily directed to linear actuators, the actuation may also or alternatively comprise a rotary actuator that translates rotary input to the linear lateral motion of the transverse members 22. For example, instead of a push input, a rotary knob or wheel can be used to communicate with a rack and pinion gear assembly, and/or other linkage assemblies and/or cam assemblies and the like.

Figure 10A:
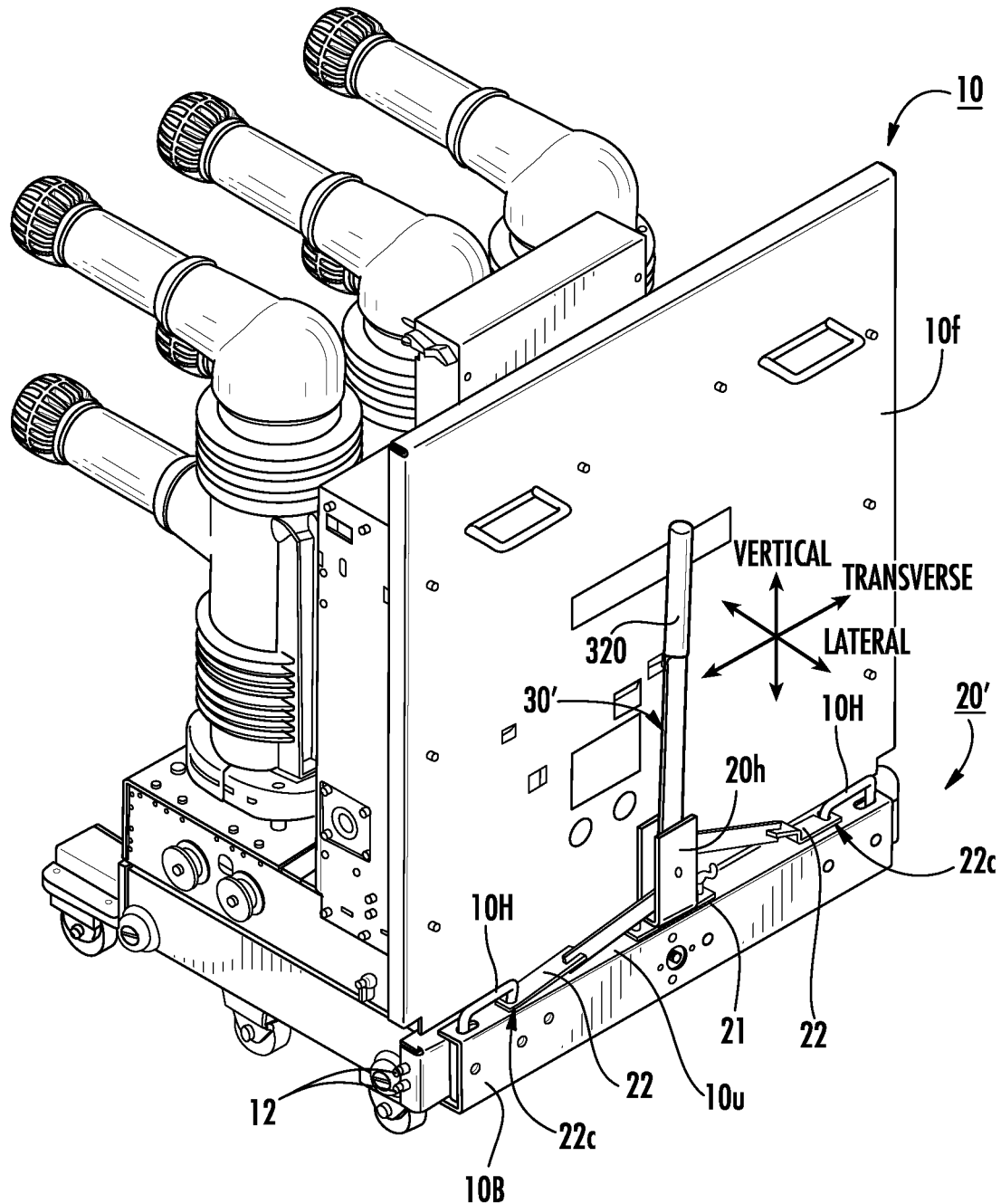
FIG. 10A is a side perspective view of another embodiment of a cradle assist assembly, shown mounted to a breaker housing with the handles and lock members in an extended position, according to embodiments of the present invention.
Figure 10B:
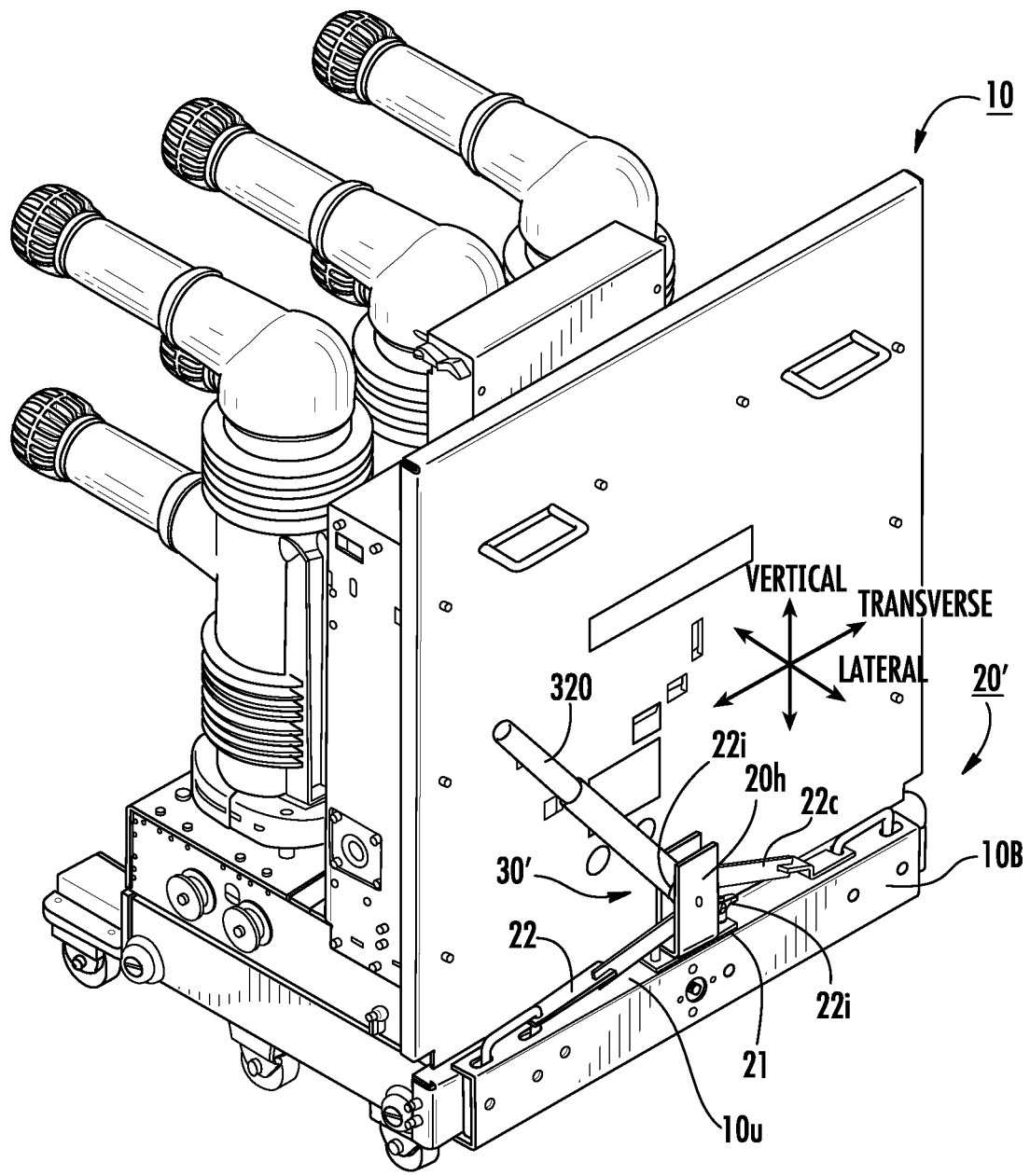
FIG. 10B is a side perspective view of the cradle assist assembly shown in FIG. 10A illustrating the lever holding the handles and lock members in a retracted position according to embodiments of the present invention.

FIGS. 10A and 10B illustrate another embodiment of a cradle assist assembly 20'. In this embodiment, an upwardly extending handle 320 can be used to actuate the (transverse) members 22. FIG. 10A illustrates the lock members 12 extended and the handle 320 substantially upright. As shown in FIG. 10B, to retract the lock members 12, the handle 320 can be pivoted attached 320p to housing 20h and can pivot laterally to one side (shown as to the left side). Again, this configuration only requires one user to actuate the cradle assist assembly 20' and pull the lock members 12 inward.

The housing 20h can include the lower plate 21 which can be attached to an upper surface 10u of the base 10B. The transverse members 22 can comprise a plurality of attached linkages 22a, 22b. Optionally, the linkages 22a, 22b can fold relative to each other or telescope, one into or over another, to form a retracted storable configuration. Optionally, the handle 320 can be a telescoping handle to allow for different height positions for various users and/or to provide for a compact storage configuration. The lower plate 21 can releasably attach to apertures 10a in the upper surface of the base 10u using bayonet or quick release attachment members 25q (as shown in FIG. 11A).

Figure 11B:
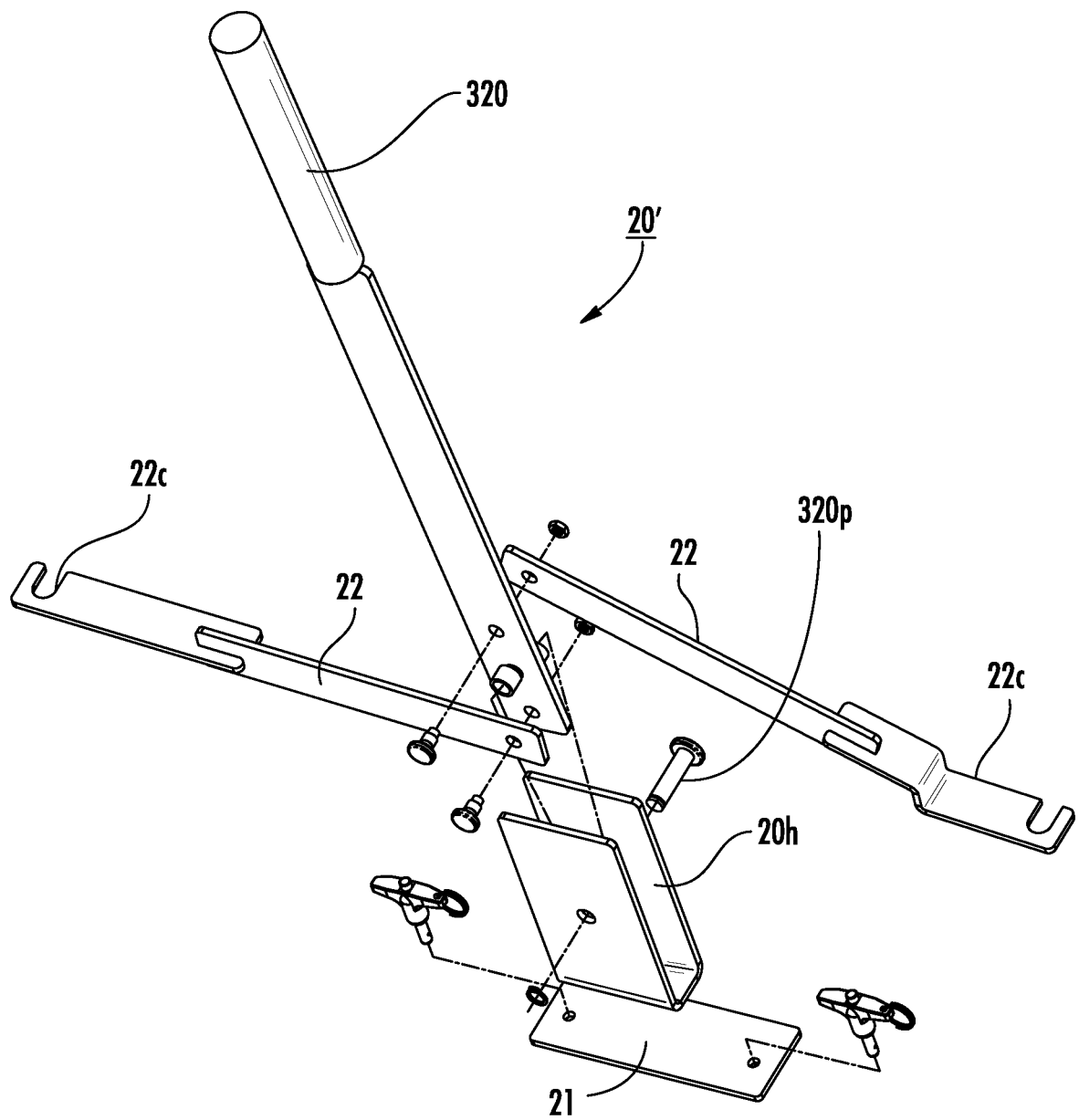
FIG. 11B is an exploded view of the assembly shown in FIG. 11A according to embodiments of the present invention.

FIG. 11A is a perspective view of the device 20' apart from the breaker 10. FIG. 11B is an exploded view of the device 20'. This configuration can be a single hand-operated design. Due to the torque arm provided by the arrangement of the handle 320 over the transverse members 22, the design can provide a relatively large mechanical advantage, e.g., it can reduce the force required to be applied by a user. The user force reduction may be between about one time to about 10 times, typically about 6 times, relative to no cradle assist assembly (direct hand contact for manual pull-in of each handle).

However, in some embodiments, no reduction in force is provided by the cradle assist device 20, 20', 20''' (FIGS. 15A-C, etc. . . . ), but the device can provide single-user operation.

FIGS. 12A-12C illustrate exemplary front, side and top views of the cradle assist assembly 20'. As noted above, the handle 320 can be pivotably attached to the housing 20h at pivot 320p. The handle 320 is the actuator 30'. The inner end 22i of one transverse member 22 can be pivotably attached to the one pivot joint 22p on handle 320 and reside a distance above the pivot point/joint 320p. The inner end 22i of the other transverse member can be attached to the other side of the pivot point/joint 320p on the handle 320. As shown in FIG. 10B, pivoting the handle 320 one direction (shown as the left direction), concurrently pulls both the right and left transverse members 22 inward.

FIGS. 13A-13C and 14A-14C illustrate another embodiment of a cradle assist assembly 20''. Again, this configuration can be hand operated. In this embodiment, the assembly 20'' can include upper mounting members 322 that engage (releasably mount to) upper handles 14H on the breaker 10. The upper mounting members 322 can include respective slots 322s that can be placed over the outwardly extending handles 14H. The left and right mounting members 322 can be pivotably attached at an inner end portion 322i to a first downwardly extending center member 320c. The upper mounting members 322 can each comprise a latch 333 that is the actuator 30'' for a respective lower transverse member 22.

The actuator 30'' is the latch 333, one for each upper mounting member 322, typically finger or thumb operated, that can be locked into position. As shown in FIG. 13B, for example, the latch 333 includes a latch bolt 333b with a laterally extending segment 333s with a perimeter of a series of notches 333n that can be ratcheted laterally into (and typically through) the latch 333 for extending and retracting a respective lower transverse member 22. The notches 333n can be regularly spaced or irregularly spaced notches. Other laterally adjustable, lockable latch configurations may be used.

As also shown, the cradle assist assembly 20'' can also include second and third downwardly extending members 320a, 320b, each of which is attached to a respective segment 333s with the notches 333n between the center member 320c and the outer end portions that reside over the handle 14H. The second and third members 320a, 320b can also be attached to a lower portion or end of the center member 320c.

The second and third members 320a, 320b can include slots 321 that receive a sliding member 325 which can allow for height adjustment based on a distance between the upper mounting members 322 and the lower (transverse) members 22.

The center member 320c can have a shorter length than the other two downwardly extending members 320a, 320b. The lower end of the center member 320c can be pivotably attached at pivot joint 320p to the lower end portions of the other downwardly extending members 320a, 320b. The second (left) member 320a can be attached to the left upper member 322l via left latch bolt 333b and can be pivotably attached to the inner end portion 22i of the left lower transverse member 22 at pivot joint 320lp$_2$. The third (right) member 320b can be attached to the right upper member 322r via right latch bolt 333b and can be pivotably attached to the inner end portion 22i of the right lower transverse member 22 at pivot joint 320lp$_1$. The lower pivot joints 320lp$_2$ and 320lp$_1$ are typically not connected and each transverse member 22r, 22l can independently translate in response to movement of the respective upper actuator 30'' (e.g., latch bolt 333b).

Figure 14A:
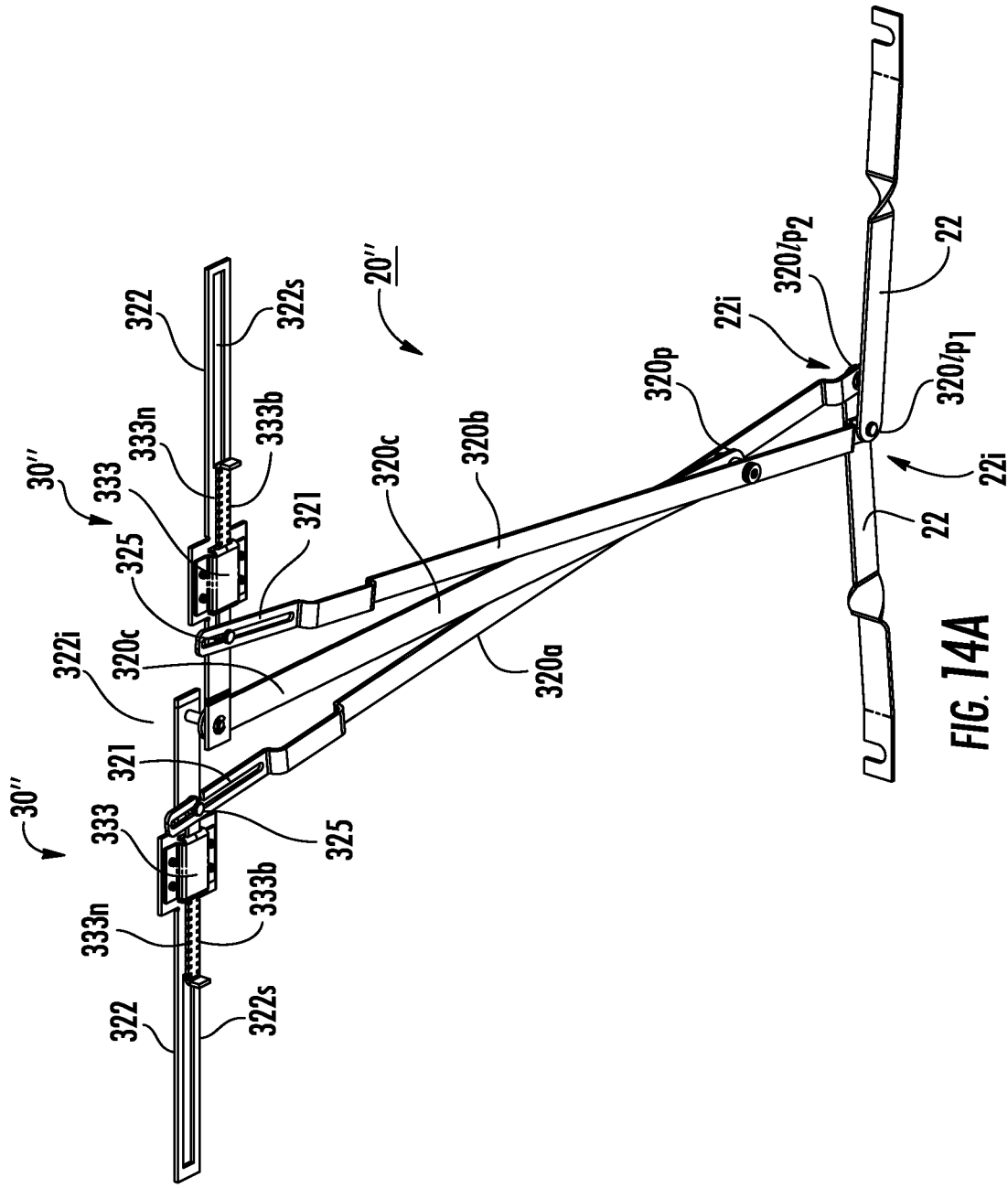
FIG. 14A is a top perspective view of the cradle assist assembly shown in FIGS. 13A and 13B.
Figure 14B:
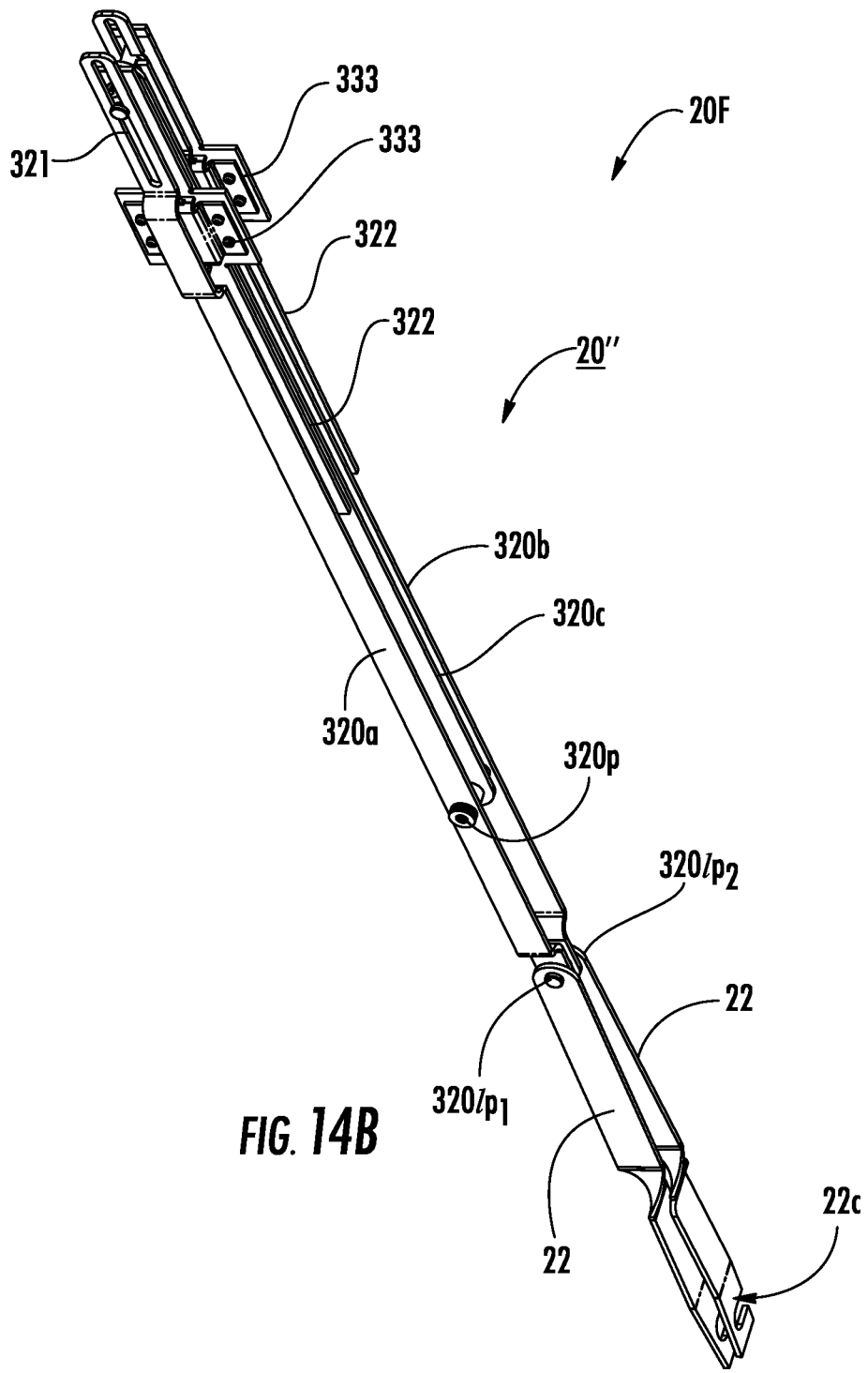
FIG. 14B is a top perspective view of the cradle assist assembly shown in FIG. 14A illustrating a compact collapsible configuration according to embodiments of the present invention.
Figure 14C:
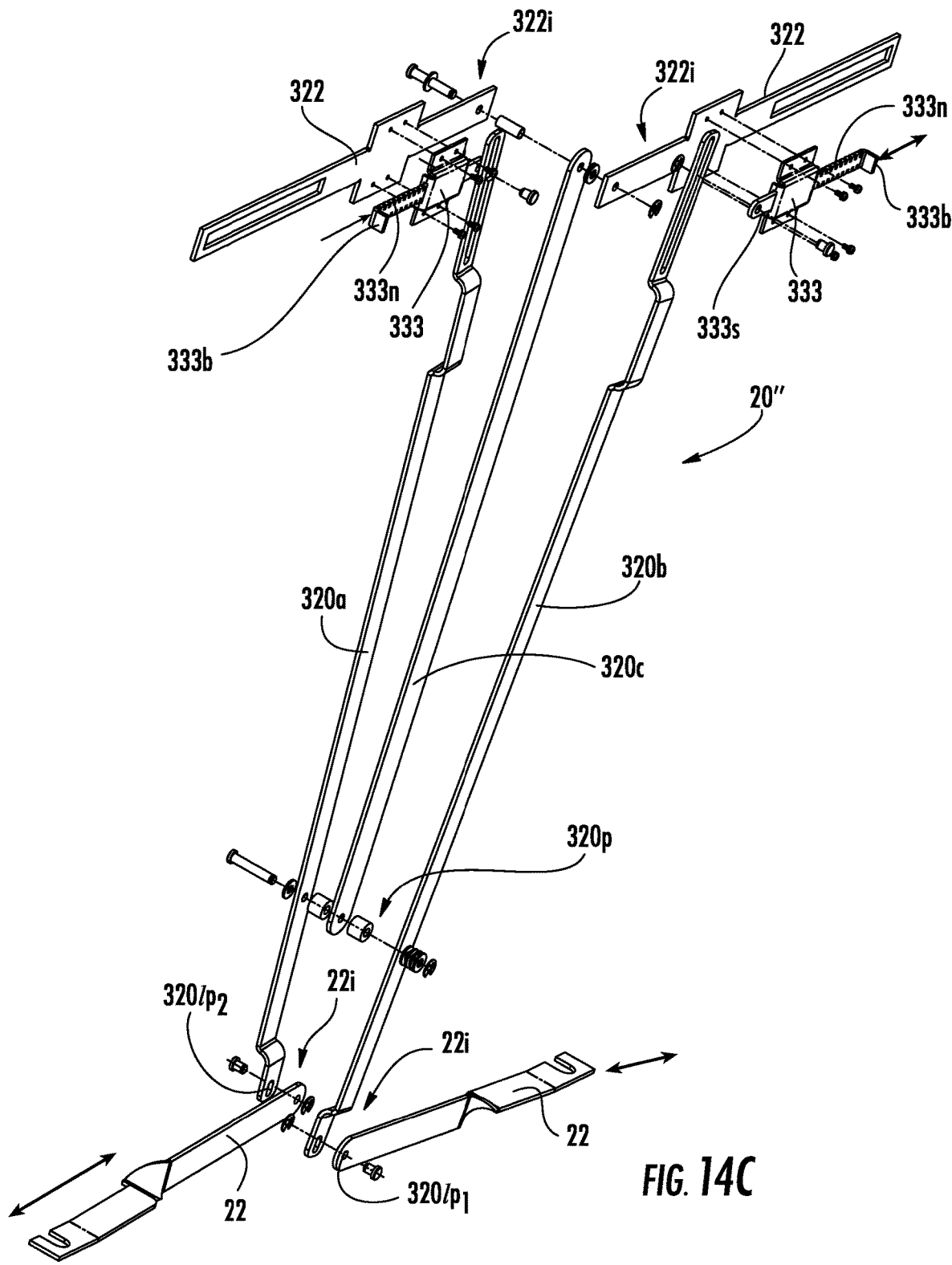
FIG. 14C is an exploded view of the device shown in FIGS. 14A and 14B.

FIG. 14B illustrates that the cradle assist assembly 20'' can have a folded configuration allowing for ease of transport and storage. In the folded configuration the upper transverse members 322 can be folded to be aligned with the downwardly extending linkages 320a, 320b, 320c. The lower transverse members 22 can also be rotated to be aligned with those linkages 320a, 320b, 320c, either in front of the linkages as shown, or folded back to be in-line with those linkages (not shown).

In the extended position, e.g., with the lock members 12 and lower transverse members 22 extended outward as shown in FIG. 13A, some or all of the notches 333n can reside to the inside of the latch 333 in contrast to the retracted configuration shown in FIG. 13B where some or all of the notches 333n reside to the outside of the respective latch 333 closer a respective upper handle 14H. The movement of the respective latch bolt 333b moves the upper end of a corresponding respective linkage 320a or 320b, inward or outward, thereby actuating the respective lower transverse member 22 to translate to the desired extended or retracted position. The cradle assist assembly 20'' can have a mechanical advantage that is about 1×, 2×, 3×, 4×, 5× or more that of non-assisted pull in of the handles 10H, e.g., it can be configured to provide leverage that is greater than 1, when used with hand operation. However, as noted above, the cradle assist assembly 20'' is not required to provide any additional leverage when used with hand operation relative to the conventional configurations.

Figure 15A:
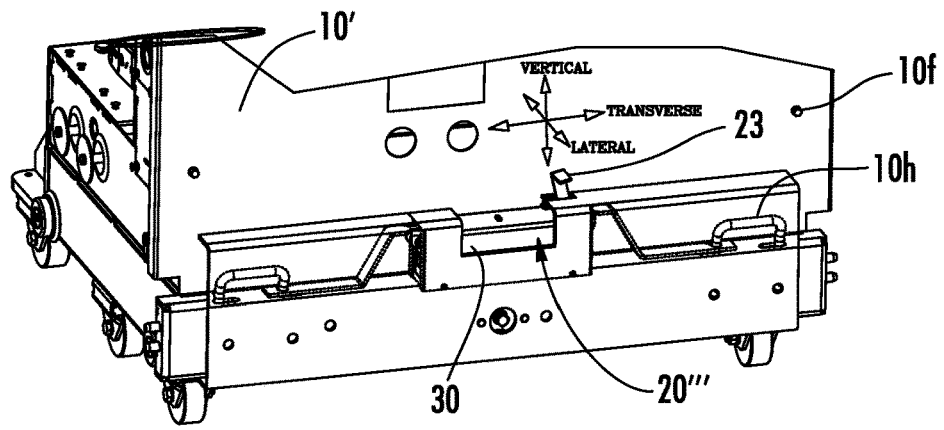
FIGS. 15A-15C are front partial perspective views of other embodiment of the cradle assist assembly, shown as an integrated rather than "add-on" part of a breaker according to some embodiments of the present invention.
Figure 15B:
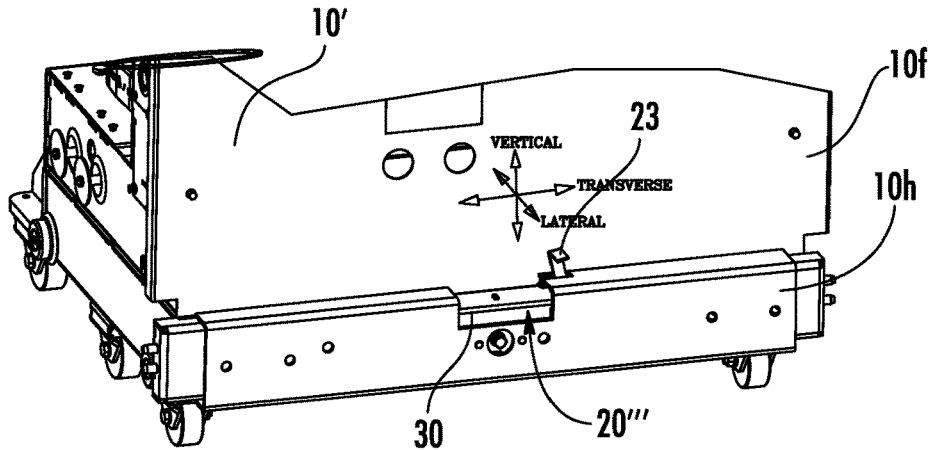
Figure 15C:
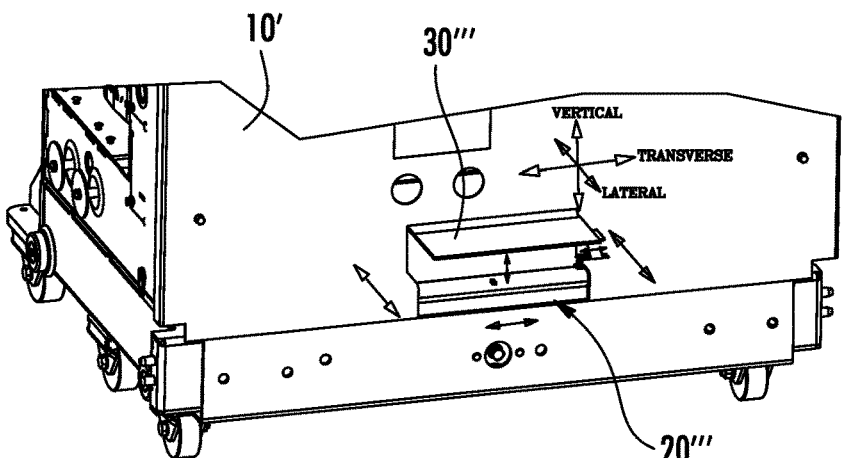

FIGS. 15A-15C illustrate that cradle assist assemblies 20''' can be integrated into cabinetry or housings of breaker cradles 10'. The entire assembly 20''' may reside inside the front cover 10f and/or base 10B. In some embodiments, at least one foot actuator 30 may be exposed via a window or cutout over the base 10B as shown in FIGS. 15A and 15B, but the other components may reside inside the cabinet or housing 10h of the breaker 10'. For automated versions using electronic or electromechanical actuation rather than manual actuators, the entire assembly 20''' may reside inside the housing 10h with appropriate latch and delatch functionality with user input switches or other user interface (UI) inputs 110i (FIGS. 17A-17C) to engage or disengage the lock members 12 provided on the outside of the panel or in a remote, wired or wireless cooperating device.

FIG. 15A illustrates a cradle assist assembly 20''' integrated into a sub-housing attached to the base 10B of the breaker 10' which extends to also enclose the handles 10H. The release lever 23 and actuator 30 are externally accessible.

FIG. 15B illustrates a cradle assist 20''' as integral to the cradle base 10B. The actuator 30 may be connected directly or indirectly via internal mechanisms to the lock members 12 inside the cradle base. The actuator 30, and optionally, the release member 23 can be externally accessible.

FIG. 15C also illustrates a cradle assist 20''' as integral to the cradle base 10B, here internal to the chassis. The actuator 30''' may be connected directly or indirectly via internal mechanisms to the lock members 12 inside the cradle base or breaker addendum (sub-housing). Optionally, the actuator 30 and/or the release member 23 can be externally accessible or open to a user, e.g., protruded out or recessed in. The actuator and/or the release member can be operated in any direction, e.g., transverse, lateral or vertical.

FIGS. 16A and 16B show that the foot operated actuator 30 can be provided as a plurality of actuators 30a, 30b, shown as right and left actuators. Similarly, four actuators may be used, two right and two left, with dedicated retract and extend functions (not shown).

FIGS. 17A-17C illustrates that the cradle assist assembly 20'' can be integrated with a chassis or breaker cradle 10'' which can include onboard latch and delatch user interface (UI) inputs 110i (e.g., buttons, touch inputs, levers or handles), typically under lock or cover to inhibit inadvertent actuation of a fully automated actuator 30 held either inside the housing 10h or in another housing with an automated actuator 30.

FIG. 17A illustrates external UI inputs 110i as latch and release/delatch buttons in electrical communication with the cradle assist assembly 20''' with an integrated power path 110p, e.g., wires, a cable and/or cord(s).

FIG. 17B illustrates an external UI control 110i that can include an external power source and/or internal power source to operate the cradle assist assembly which can be incorporated as an external cradle assist assembly or an integrated cradle assist assembly (shown as external). The control 110i can be an external control that is connected to the breaker or switchgear 10'' via a cable or cord 110p or even wirelessly.

FIG. 17C illustrates a cradle 10'' which is releasably held by a switchgear or breaker compartment 100c (FIGS. 18A-18D). FIG. 17C illustrates a series of different positions, positions A-D, that can be obtained using a cradle assist assembly 20''' as a sequence of latching the breaker cradle 10'' inside the switchgear/cell/cassette 100c. At position A, a breaker can be manually pushed inside the switchgear. At position B, the cradle assist actuator 30 can be actuated (e.g., depressed) such that the interlock elements 12 are retracted. At position C, the breaker can be manually pushed up to the DISCONNECT position. The cradle release member can be released and/or engaged so that the breaker can be locked in the DISCONNECT position. At position D, the cradle assist actuator can be actuated (e.g., depressed again) and the breaker can be pushed inside the compartment up to the TEST position. The release lever can be engaged to release the interlocking element on the cradle 10'' so that the breaker is locked in the TEST condition. Although not shown, optionally, the cradle assist assembly 20''', or components thereof such as the UI and/or power cord (or transverse arms), can be detached from the breaker cradle. The breaker can be racked from TEST to CONNECT position.

As noted above, examples of the automated actuators include a pneumatic cylinder, an electric motor (e.g., servomotor), solenoid and the like that can provide the desired translation, e.g., that can push the actuator plate 27 down and pull it up, for example. Once the interlock members 12 are deployable and retractable via the cradle assist assemblies described herein, the handles 10H may no longer be required and the assemblies can be configured to work with other internal components, for example.

Figure 18C:
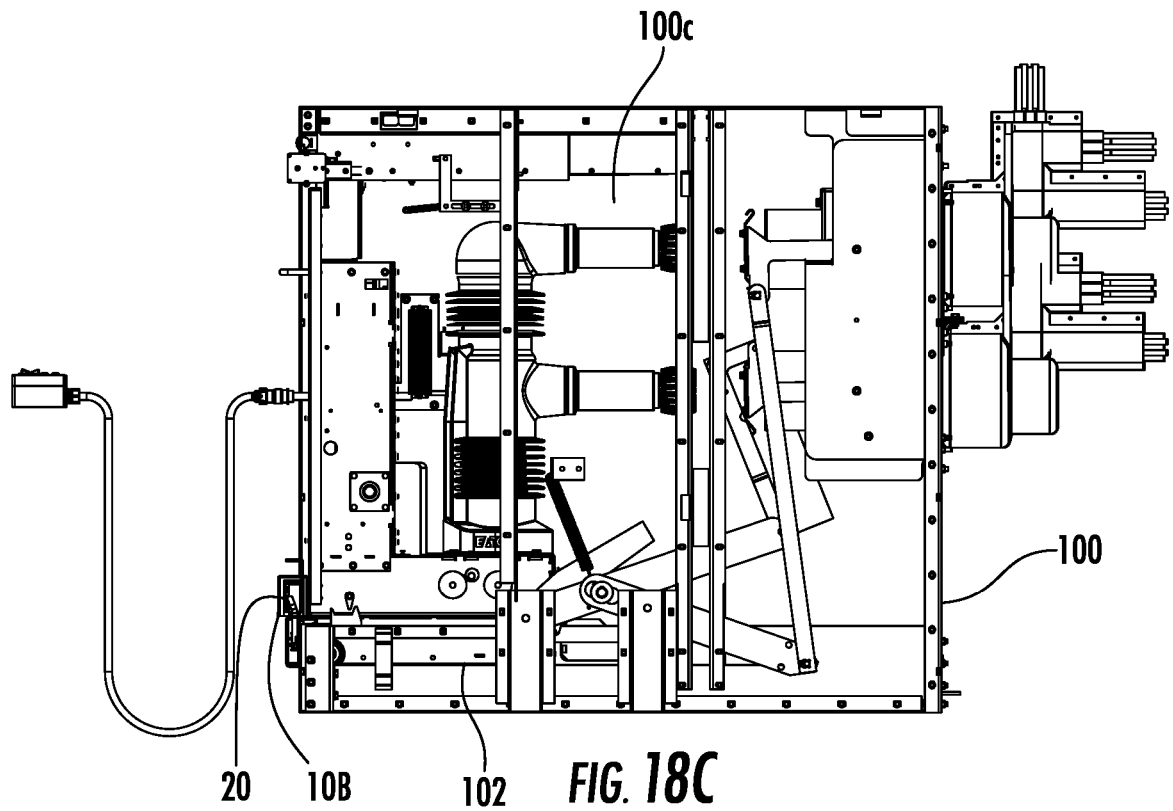
FIG. 18C is a partial cutaway side view of the contactor truck in a DISCONNECT position according to embodiments of the present invention.
Figure 18D:
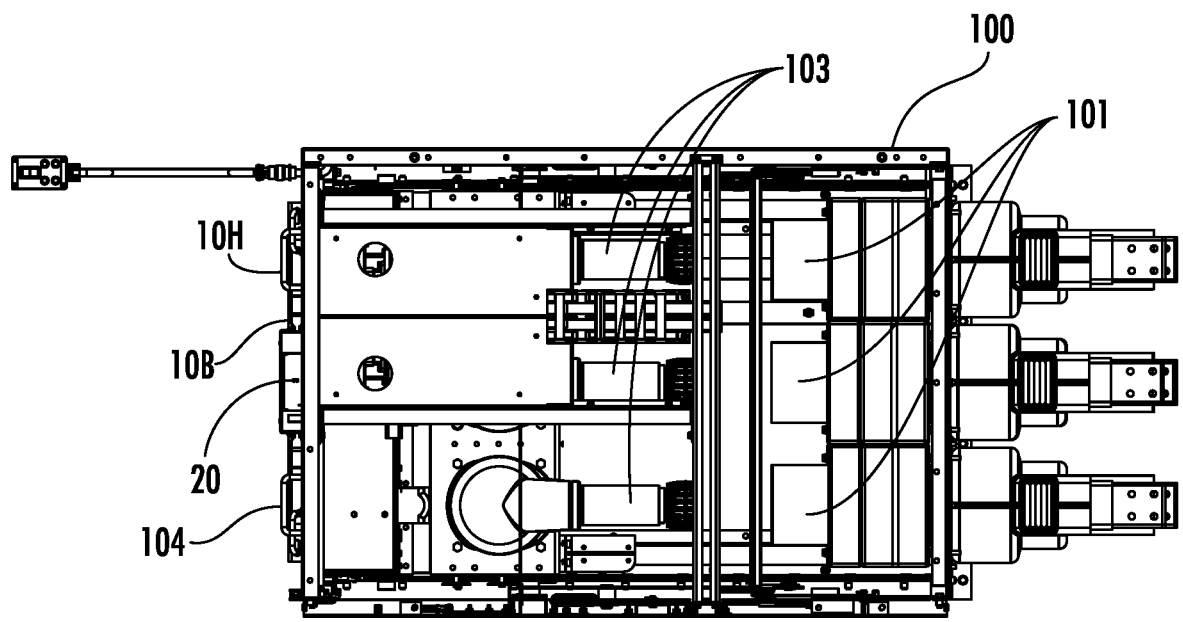
FIG. 18D is a top view of the contactor truck in the DISCONNECT position shown in FIG. 18C.

FIGS. 18A-18D illustrate an example of an electric switchgear housing 100. Electric switchgear are well known to those of skill in the art. The switchgear housing 100 has at least one internal compartment 100c for a cradle 10 (e.g., aka contactor truck) provided with a door and electrical conductors adapted for connection to a load. The lock members 12 engage components in the compartment/door to interlock the cradle 10 in position. The cradle 10 can be a withdrawable (aka, "draw out") contactor truck with wheels 10w that is movable inside the compartment 100c between TEST or CONNECT positions (FIGS. 18A, 18B) and a DISCONNECT position (FIGS. 18C, 18D). The wheels 10w can be supported by a support surface 102 (e.g., rails) of a rack or shelf. Each phase of the switching device 103 is electrically connected to a corresponding electrical conductor 101 in the connected position. In the withdrawn position, each phase of the switching device is electrically separated from the corresponding electrical conductor. During movement of the switching device between the connected position and the withdrawn or DISCONNECT position, the main contacts are kept electrically separated. Typical medium voltage (MV) withdrawable contactors have a standard levering-in cradle that requires a user to hand crank the component into the switchgear. FIGS. 18A-18D show only TEST and DISCONNECT interlocking. This interlock is most useful to go from "DISCONNECT" to "TEST" position and vice versa. Generally, a breaker is locked with the lock members 12 at a TEST position and is racked inside (with square threaded screw or similar mechanisms) the switchgear to be in service or "CONNECT" position. Thus, as far as cradle 10, 10'', 10''' is concerned, the cradle position is the same in TEST and CONNECT position in most recent type of cradle designs. However, in some older designs, the entire cradle as well moves from TEST to CONNECT position along with the breaker.

Figure 19:
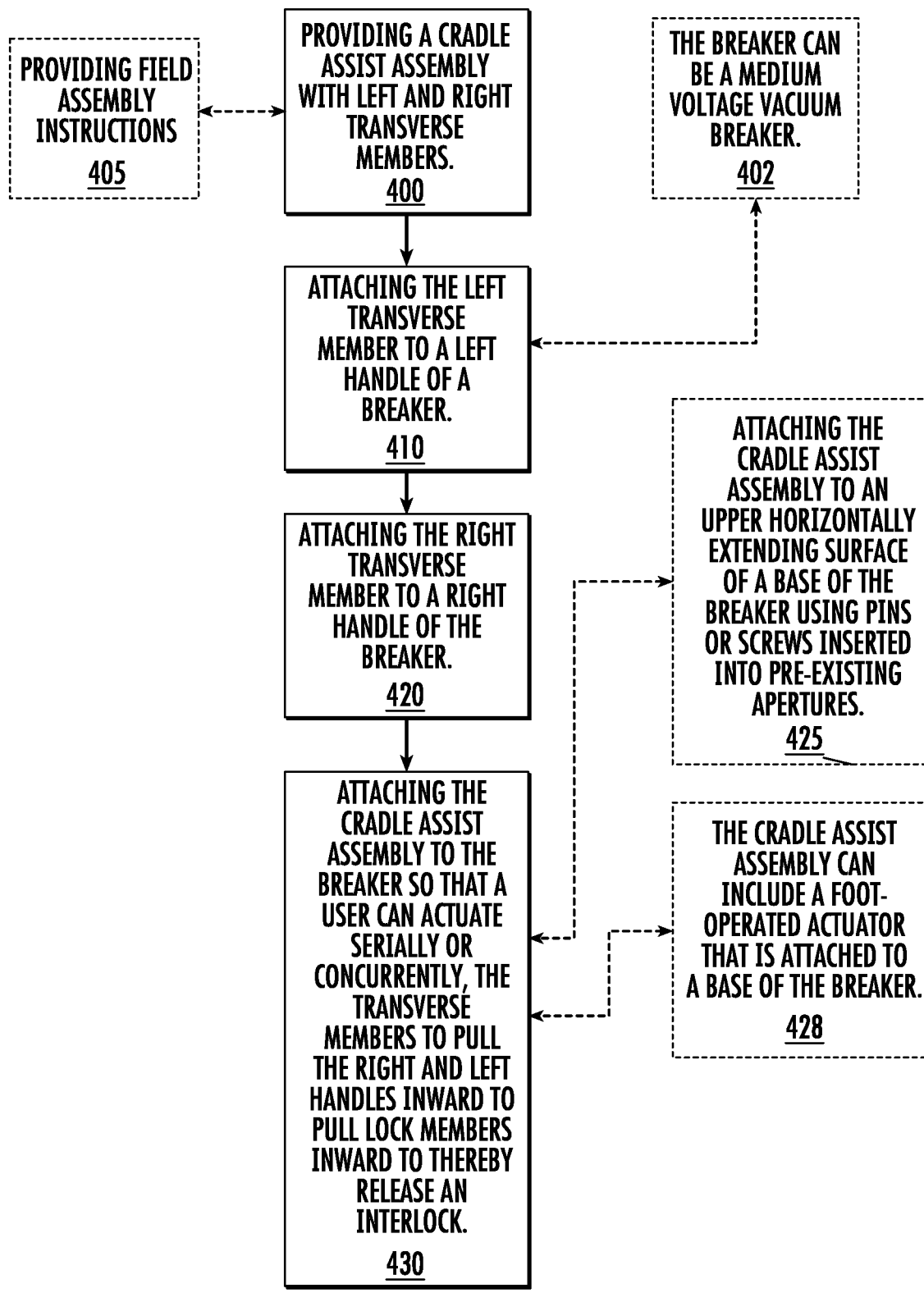
FIG. 19 is a flow chart of a method of modifying or making a breaker according to embodiments of the present invention.

FIG. 19 is an example of operations that can be carried out to retrofit a breaker cradle according to embodiments of the present invention. As shown, a cradle assist assembly with left and right transverse members is provided (block 400). The left transverse member can be attached to a left handle of a breaker (block 410). The right transverse member can be attached to a right handle of the breaker (block 420). The cradle assist assembly can be attached to the breaker so that a user can actuate, serially or concurrently, the transverse members to pull the right and left handles inward to pull lock members inward to thereby release an interlock (block 430).

Field assembly instructions can be provided with the cradle assist assembly (block 405).

The breaker can be a ROF medium voltage vacuum breaker (block 402).

The cradle assist assembly can be attached on an upper horizontally extending surface of a base of the breaker using pins or screws inserted into pre-existing apertures (block 425).

The cradle assist assembly can include a foot-operated actuator that is attached to a base of the breaker (block 428).

Embodiments of the invention provide a cradle assist assembly 20, 20', 20'', 20''' that can releasably engage or be affixed to a target breaker cradle to allow a breaker cradle to be withdrawn or inserted by a single operator. The cradle assist assembly can be configured as a quick and easy to install assembly tool which can be assembled or disassembled from a breaker cradle in a few minutes or less.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A breaker, ground and test device (G&TD), or dummy breaker cradle, comprising:
    a cradle housing having a base comprising at least one right lock member and at least one left lock member configured to be able to retract and extend from the base between a lock position and an unlocked position; and
    a cradle-assist assembly attached to the breaker cradle housing and/or base or residing at least partially in the breaker cradle housing and/or base, the cradle-assist assembly comprising at least one actuator configured to translate the at least one right and the at least one left lock members from the lock position to the unlocked position in response to input from a user,
    wherein the breaker cradle comprises upper right and left externally accessible handles and lower right and left externally accessible handles, and wherein the cradle assist assembly comprises upper right and left mounting members that attach to respective upper right and left handles, and lower right and left transverse members that attach to respective lower right and left handles, and wherein the at least one actuator includes a left actuator attached to the upper left mounting member and a second right actuator that is attached to the upper right mounting member.

2. The breaker cradle of claim 1, further comprising a plurality of downwardly extending members attaching the upper and lower mounting members, and wherein the right and left actuators are configured to laterally slide along respective upper right and left transverse members to extend and retract the lower right and left transverse members.

3. The breaker cradle of claim 2, wherein the plurality of downwardly extending members includes a center member that is attached to both inner ends of the right and left upper mounting members and that resides a distance above the lower right and left transverse members, a left member attached to (i) the left upper mounting member, (ii) a lower end portion of the center member at a pivot joint and (iii) the left lower transverse member, and a right member attached to (i) the right upper mounting member, (ii) the lower end portion of the center member at a pivot joint, and (iii) the right lower transverse member.

4. The breaker cradle of claim 2, wherein the cradle assist assembly is releasably attached to the breaker cradle and has a foldable storage configuration.

5. A method of releasing retractable lock members in communication with laterally translating handles, from engagement with a switchgear, circuit breaker or contactor, comprising:
    manually deploying at least one actuator to pull the lower handles on a breaker cradle laterally inward to thereby release the lock members from engagement with the switchgear, circuit breaker or contactor,
    wherein the manually deploying is carried out by accepting foot depression of an actuator plate in a housing residing externally and on a base of the breaker cradle.

6. The method of claim 5, wherein the at least one actuator is held in a housing attached to a base of the breaker cradle, the housing also holding at least one internal lock with a pin, wherein the internal lock is in communication with the at least one actuator and an external release member, the method further comprising moving the release member to allow movement of the at least one actuator, wherein the internal lock holds the pin in an angled channel that allows the pin to move in response to movement of the release member.

7. A breaker, ground and test device (G&TD), or dummy breaker cradle, comprising a cradle with an integrated cradle assist assembly residing at least partially internal to a chassis of the cradle, the cradle assist assembly comprising at least one actuator in communication with lock members that engage cooperating lock features or members in a cell or compartment of a breaker, contactor or switchgear, the at least one actuator configured to extend and retract the lock members between locked and unlocked positions,
    wherein the at least one actuator comprises an electrically powered actuator, and wherein the cradle assist assembly comprises transverse members attached to the at least one actuator, the cradle further comprising externally accessible user interface inputs held on a chassis of the cradle in communication with the at least one actuator configured to allow a user to actuate the electrically powered actuator to retract and extend the transverse members of the integrated cradle assist assembly.

8. The cradle of claim 7, wherein the at least one actuator is manually operated or electrically powered via an onboard and/or external power source.

9. The cradle of claim 7, wherein the at least one actuator comprises at least one of a solenoid, a pneumatic actuator or a hydraulic actuator.

* * * * *